US012418748B2

(12) United States Patent
Walther et al.

(10) Patent No.: US 12,418,748 B2
(45) Date of Patent: Sep. 16, 2025

(54) APPARATUS AND METHOD FOR AUTOMATIC ADAPTION OF A LOUDSPEAKER TO A LISTENING ENVIRONMENT

(71) Applicant: Fraunhofer-Gesellschaft zur Foerderung der angewandten Forschung e.V., Munich (DE)

(72) Inventors: Andreas Walther, Erlangen (DE); Albert Prinn, Erlangen (DE); Cagdas Tuna, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/961,329

(22) Filed: Oct. 6, 2022

(65) Prior Publication Data

US 2023/0093185 A1 Mar. 23, 2023

Related U.S. Application Data

(63) Continuation of application No. PCT/EP2021/058770, filed on Apr. 1, 2021.

(51) Int. Cl.
*H04R 3/08* (2006.01)
*H04R 29/00* (2006.01)

(52) U.S. Cl.
CPC ............. *H04R 3/08* (2013.01); *H04R 29/001* (2013.01)

(58) Field of Classification Search
CPC ........ H04R 3/08; H04R 29/001; H04R 3/002; H04R 3/005; H04R 9/06; H04R 29/008; H04S 7/301

(Continued)

(56) References Cited

U.S. PATENT DOCUMENTS 5,479,502 A 12/1995 Ohga et al.
6,731,760 B2 5/2004 Pedersen (Continued)

FOREIGN PATENT DOCUMENTS

EP 0113370 A1 7/1984
JP H09233593 A 9/1997

(Continued)

OTHER PUBLICATIONS

Pedersen, Jan Abildgaard, "Adjusting a loudspeaker to its acoustic environment", Convention paper presented at the 115th convention / Audio Engineering Society: Oct. 10, 2003-Oct. 13, 2003 AES, New York, NY, No. 5880, XP002627369, Oct. 10, 2003, pp. 1-13 (Year: 2003).*

(Continued)

*Primary Examiner* — Paul Kim
(74) *Attorney, Agent, or Firm* — Perkins Coie LLP; Michael A. Glenn

(57) ABSTRACT

An apparatus for processing an audio input signal having one or more audio input channels to obtain an audio output signal having one or more audio output channels has an estimation unit configured to estimate a radiation resistance of each driver of one or more drivers of each loudspeaker of one or more loudspeakers as an estimated radiation resistance; or as an estimated radiation impedance, wherein said estimated radiation impedance has estimated information on the radiation resistance of said driver; and a processing unit configured to obtain the audio output channels by processing each audio input channel depending on the estimated radiation resistance or the estimated radiation impedance of each driver of each loudspeaker. The estimation unit is configured to estimate the estimated radiation resistance or the estimated radiation impedance depending on estimated sound pressure information indicating an estimation of sound pres- (Continued)

sure at said driver of said loudspeaker, and depending on estimated velocity information indicating an estimation of a driver velocity of said driver of said loudspeaker.

73 Claims, 28 Drawing Sheets

(58) Field of Classification Search
USPC ........................................................ 381/98
See application file for complete search history.

(56) References Cited

U.S. PATENT DOCUMENTS

| | | | | |
|---|---|---|---|---|
| 9,743,181 | B2 | 8/2017 | Choisel et al. | |
| 10,149,087 | B1 * | 12/2018 | Choisel | H04S 7/301 |
| 10,299,039 | B2 | 5/2019 | Kriegel et al. | |
| 2002/0154785 | A1 | 10/2002 | Pedersen | |
| 2003/0105540 | A1 | 6/2003 | Debail | |
| 2003/0142832 | A1 | 7/2003 | Meerkoetter et al. | |
| 2013/0202122 | A1 | 8/2013 | Citerin | |
| 2014/0321682 | A1 | 10/2014 | Kofod-hansen et al. | |
| 2017/0195790 | A1 | 7/2017 | Choisel et al. | |
| 2018/0262175 | A1 | 9/2018 | Celestinos Arroyo | |
| 2018/0352358 | A1 | 12/2018 | Choisel et al. | |

FOREIGN PATENT DOCUMENTS

| | | | |
|---|---|---|---|
| JP | 2002527969 | A | 8/2002 |
| JP | 2003524952 | A | 8/2003 |
| JP | 2005316452 | A | 11/2005 |
| JP | 2007198926 | A | 8/2007 |
| JP | 2008064639 | A | 3/2008 |
| JP | 2017152857 | A | 8/2017 |
| WO | 8400274 | A1 | 1/1984 |
| WO | 0021331 | A1 | 4/2000 |
| WO | 2020143472 | A1 | 7/2020 |

OTHER PUBLICATIONS

Largarias, Jeffrey C, et al., "Convergence Properties of the Nelder—Mead Simplex Method in Low Dimensions", SIAM Journal on Optimization, vol. 9, No. 1, Dec. 1998, Dec. 1998, pp. 112-147.

Moreno, Jorge N, "Measurement of Loudspeaker Parameters Using a Laser Velocity Transducer and Two-Channel FFT Analysis*", Journal of the Audio Engineering Society, Apr. 1, 1991 Audio Engineering Society, New York, NY, US—ISSN 1549-4950, vol. 39, No. 4, XP000205571, Apr. 1, 1991, pp. 243-249.

Nelder, J. A, et al., "A Simplex Method for Function Minimization", The Computer Journal, vol. 7, Issue 4, Jan. 1965, Jan. 1965, pp. 308-313.

Pedersen, Jan Abildgaard, "[Uploaded in 2 parts] Adjusting a loudspeaker to its acoustic environment", Convention paper presented at the 115th convention / Audio Engineering Society: Oct. 10, 2003; Oct. 10, 2003-Oct. 13, 2003 AES, New York, NY, No. 5880, XP002627369, Oct. 10, 2003, pp. 1-13.

Jones, Richard W, et al., "Velocity Estimator Based Compensation for Loudspeakers", IFAC Proceedings vols. 33(26), 419-424. doi:10.1016/s1474-6670(17)39180-2 (p. 421), 2000, 6 pp.

Jung, Ylva, "Linearisation of micro loudspeakers using adaptive control", Avdelningen för Reglerteknik Department of Electrical Engineering (pp. 17, 27), 125 pp.

* cited by examiner

APPARATUS AND METHOD FOR AUTOMATIC ADAPTION OF A LOUDSPEAKER TO A LISTENING ENVIRONMENT

CROSS-REFERENCE TO RELATED APPLICATIONS

This application is a continuation of copending International Application No. PCT/EP2021/058770, filed Apr. 2, 2021, which is incorporated herein by reference in its entirety, and additionally claims priority from International Application No. PCT/EP2020/060269, filed Apr. 9, 2020, which is also incorporated herein by reference in its entirety.

TECHNICAL FIELD

The present invention relates to audio reproduction, and, in particular, to an apparatus and a method for automatic adaption of a loudspeaker to a listening environment.

BACKGROUND OF THE INVENTION

A general issue in audio reproduction with loudspeakers is that during sound reproduction the loudspeaker is interacting with its environment, which is often an enclosed space, e.g. a living room. Even though the singular form "loudspeaker" or "driver" is commonly used in the following, the described phenomena and concepts in general do also apply to the use of multiple loudspeakers or multiple drivers, even though this is not specifically mentioned everywhere.

Loudspeakers can be optimized during the design and manufacturing process to perform as intended under specific predefined conditions or assumptions (e.g. for a reference position in a reference room, or optimization under anechoic conditions). However, as soon as the loudspeaker is put into a different environment, its performance will be influenced by the environment. This is mainly due to the fact that the sound that is generated by/radiated from the loudspeaker is interacting with and as such is influenced by the surfaces and objects in the loudspeaker's vicinity. Such influences are e.g. reflection, absorption, diffraction. Especially in the lower frequency range, proximity to boundary surfaces can cause significant changes in the loudspeaker's performance.

The sound field that actually builds up at a specific listener position is a combination of all contributing sounds, in particular, direct sound from the loudspeaker plus reflected sound from the environment.

Since the interaction between direct sound and reflected sound is specific for individual source-receiver position combinations, the actual performance of the loudspeaker changes both with changing position of the loudspeaker and changing position of the listener within the actual listening environment.

It is such often desired that the loudspeaker is adjusted to the actual listening situation.

Such, the performance of a loudspeaker can be adjusted by applying suitable filters for a given loudspeaker position and a given listener position.

Usually the adjustment is done in the state of the art by using a measurement microphone at the listening position and, based on specific test signals, generation of equalization filters.

If sound reproduction in a broader listening area that covers multiple listening positions should be adapted, then usually multiple measurements, e.g., multipoint measurements, are used.

Different averaging approaches considering the multiple measurements can be used to find the best compromise equalization for the whole (measurement) area.

The aforementioned concepts entails a user interaction (for initial setup, and they would need it every time the loudspeaker position (for some even if the listener position) is changed). Plus, due to the need to setup a microphone(s) in the listening area, they may be intrusive. Overall, not very user friendly or easy to use. Additionally, for naïve users, even that may pose problems, and there is the chance that they do something wrong.

Besides those single-point measurement or multipoint-measurement optimizations, it is possible to mitigate some general influences of listening environments on the loudspeaker performance by rough adjustment concepts that do not entail a specific measurement.

E.g. if the loudspeaker is placed close to a wall, this will result in a level increase in the lower frequency range. Some loudspeakers address that by offering dip switches that can activate predefined filters that would tackle such common scenarios.

However, such kinds of settings already entail some kind of expert knowledge from the user to choose the correct settings. Furthermore, they are not very flexible.

With the advent of wireless portable loudspeakers that can easily be moved to different positions, concepts for adaption of the loudspeaker to its actual placement that have a beneficial effect in a large listening area are desired. Such an equalization can be achieved by utilizing a scheme that targets a global equalization, which takes into consideration influences of the room on the reproduced/generated sound field that can be measured in one position but are valid basically all over the room.

In the state of the art, methods exist that estimate a global response, which reveals characteristics that pertain throughout the entire listening environment (i.e. they correspond to the average one would get by multiple single point measurements throughout the room).

Such, by equalizing those global characteristics, an advantageous adaption of the loudspeaker to the specific room and its specific present setup position can be made which is beneficial for listeners all over the room. These described concepts have been used for automatic adaption of loudspeakers to their environment.

Known outlines that the calculation of a global equalization can be based on estimation of sound pressure and velocity to estimate the frequency dependent radiation resistance, in particular, the real part of the frequency dependent radiation impedance.

To measure or estimate the radiation impedance, information of the pressure and normal surface velocity at the source is used. According to the state of the art, this could be achieved by processing

- two measured pressure signals,
- one measured pressure signal and one measured displacement signal,
- one measured pressure signal and one measured velocity signal,
- one measured pressure signal and one measured acceleration signal, or
- one measured pressure signal and one measured current signal.

In some known technologies, the measurement with e.g. two microphones to derive the velocity signal, or the derivation of a velocity signal based e.g. on a measured current is termed an estimation.

US 2002/0154785 A1 describes a method and apparatus for controlling the performance of a loudspeaker in a room. The method comprises the steps of determining the acceleration, velocity or displacement of a loudspeaker diaphragm and the sound pressure in front of the diaphragm in a reference acoustic environment, and determining based on these quantities the radiation resistance, radiated acoustic power or real part of the acoustic wave impedance. The same parameters are measured in the actual listening environment, and the ratio of both is used to control a correction filter. The complete procedure is based on the realization that there is a strong link between the way the loudspeaker sounds, in particular in the bass range, and its radiation resistance as a function of frequency, being the real part of the radiation impedance. According to US 2002/0154785 A1, parameters are measured in a first environment and same parameters are measure in a second environment, a ratio of both measurements is taken to define a correction filter. Summarizing, US 2002/0154785 A1 relates to a method for controlling the performance of a loudspeaker in a room wherein in a first acoustic environment the resultant movement of the loudspeaker driver diaphragm and the associated force, arising from the sound field in the room, acting on it are determined by measuring suitable parameters defining a first complex transfer function. In a second acoustic environment a second complex transfer function is determined by measuring the same or different parameters of the loudspeaker driver relating to the room. The ratio between the real parts of the first and second transfer function is used to define the performance of a correction filter. The filter is applied in the signal chain to the loudspeaker driver.

WO 00/21331 A1 describes that to make a loudspeaker environmentally adaptive, a measurement of the velocity or acceleration of the loudspeaker diaphragm and the associated sound pressure in front of the diaphragm, an accelerometer and a microphone are needed to determine the radiation resistance of the diaphragm. WO 00/21331 A1 further realized that those two sensors would have to be expensive to ensure consistent behavior over a long lifetime. Such, a way is presented to exchange the accelerometer by another microphone that is placed in small distance from the diaphragm. This is based on the insight that changes in the radiation resistance can be based on a measurement of the sound pressure in two (or more) points spaced differently from the loudspeaker diaphragm.

Further, in WO 00/21331 A1, ways are presented to use only a single microphone which is physically moved to different positions. Summarizing, WO 00/21331 A1 relates to a loudspeaker of the type having sensor means for the determination of the radiation resistance of the diaphragm, expressed by the velocity/acceleration of the loudspeaker diaphragm and the sound pressure in a distance from the diaphragm. Thereby, via a signal processing unit, provide a control signal to a filter unit adjusting the performance of the loudspeaker in an adaptive manner to the acoustical characteristics of the listening room. Said sensors comprise a microphone for detecting said sound pressure. The sensor equipment comprises microphone means for detecting the sound pressure in at least two points differently spaced from the diaphragm, and that carrier means are provided enabling one same microphone to be effectively and successively exposed to the sound pressure in each of the at least two points. In WO 00/21331 A1, the two measurement points mentioned here really have to be close to the diaphragm. If the distance is getting bigger, the estimation will increasingly fail. Furthermore, WO 00/21331 A1 outlines that it would be sufficient to obtain a reference value i.e. the absolute radiation resistance except for a scaling factor, for comparison with later detections of the sound pressure in the same two (or more) points.

US 2017/0195790 A1 describes a loudspeaker system with an external microphone outside of the loudspeaker's enclosure, and an internal microphone inside the loudspeaker's enclosure. A transfer function for an equalization filter is determined responsive to the external and internal microphone. The external microphone(s) [one, two or more] is(are) located to measure acoustic pressure in the vicinity of the driver. The internal microphone is used to indirectly measure volume velocity of the loudspeaker diaphragm.

Summarizing, according to the known technology, the volume velocity is estimated from the gradient of sound pressure in front of the loudspeaker (uses either two very similar measurement devices, or moving parts, or an accelerometer). Global equalization solutions can be based on estimation of the sound pressure in front of the loudspeaker and the volume velocity. The sound pressure can be measured with a microphone close to/in front of the loudspeaker (i.e. in front of the membrane/driver/diaphragm). Volume velocity estimation has been described based on estimating the gradient of sound pressure in front of the loudspeaker (e.g. by using two microphones, or a single microphone with mechanical means to use that single microphone for measurements at two spatially different locations).

SUMMARY

According to an embodiment, an apparatus for processing an audio input signal having one or more audio input channels to obtain an audio output signal having one or more audio output channels, may have: an estimation unit configured to estimate a radiation resistance of each driver of one or more drivers of each loudspeaker of one or more loudspeakers as an estimated radiation resistance; or configured to estimate a radiation impedance of each driver of the one or more drivers of each loudspeaker of the one or more loudspeakers as an estimated radiation impedance, wherein said estimated radiation impedance of said driver has estimated information on the radiation resistance of said driver, and a processing unit configured to obtain the one or more audio output channels by processing each audio input channel of the one or more audio input channels depending on the estimated radiation resistance or depending on the estimated radiation impedance of each of the one or more drivers of each of the one or more loudspeakers, wherein to estimate the estimated radiation resistance or the estimated radiation impedance of each driver of the one or more drivers of each loudspeaker of the one or more loudspeakers, the estimation unit is configured to estimate the estimated radiation resistance or the estimated radiation impedance depending on estimated sound pressure information indicating an estimation of sound pressure at said driver of said loudspeaker, and depending on estimated velocity information indicating an estimation of a driver velocity of said driver of said loudspeaker.

Another embodiment may have an apparatus having an estimation unit, wherein the estimation unit is configured to estimate a first radiation resistance of each driver of one or more drivers of each loudspeaker of one or more loudspeakers as a first estimated radiation resistance before a first point in time; or is configured to estimate a first radiation impedance of each driver of the one or more drivers of each loudspeaker of the one or more loudspeakers as a first estimated radiation impedance before the first point in time, wherein said first estimated radiation impedance of said driver has estimated information on the first radiation resistance of said driver, wherein to estimate the first estimated radiation resistance or the first estimated radiation impedance of each driver of the one or more drivers of each loudspeaker of the one or more loudspeakers, the estimation unit is configured to estimate the first estimated radiation resistance or the first estimated radiation impedance depending on first estimated sound pressure information indicating an estimation of sound pressure at said driver of said loudspeaker before the first point in time, and depending on first estimated velocity information indicating an estimation of a first driver velocity of said driver of said loudspeaker before the first point in time, wherein the estimation unit is configured to estimate a second radiation resistance of each driver of the one or more drivers of each loudspeaker of the one or more loudspeakers as a second estimated radiation resistance after a second point in time; or is configured to estimate a second radiation impedance of each driver of the one or more drivers of each loudspeaker of the one or more loudspeakers as a second estimated radiation impedance after the second point in time, wherein said second estimated radiation impedance of said driver has estimated information on the second radiation resistance of said driver, wherein the second point in time occurs after the first point in time, wherein to estimate the second estimated radiation resistance or the second estimated radiation impedance of each driver of the one or more drivers of each loudspeaker of the one or more loudspeakers, the estimation unit is configured to estimate the second estimated radiation resistance or the second estimated radiation impedance depending on second estimated sound pressure information indicating an estimation of sound pressure at said driver of said loudspeaker after the second point in time, and depending on second estimated velocity information indicating an estimation of a second driver velocity of said driver of said loudspeaker after the second point in time, wherein the estimation unit is configured to determine and to output whether the apparatus is in a first state or whether the apparatus is in a second state depending on a radiation resistance difference indicating a difference between the second estimated radiation resistance and the first estimated radiation resistance, or depending on a radiation impedance difference indicating a difference between the second estimated radiation impedance and the first estimated radiation impedance, wherein the second state indicates that the apparatus is malfunctioning or that the apparatus has been relocated, and wherein the first state indicates that the apparatus is functioning and that the apparatus has not been relocated.

According to another embodiment, a system may have: the above inventive apparatus for processing an audio input signal, and the loudspeaker, wherein the loudspeaker is configured to output at least one of the one or more audio output channels.

According to another embodiment, a method for processing an audio input signal having one or more audio input channels to obtain an audio output signal having one or more audio output channels, may have the steps of: estimating a radiation resistance of each driver of one or more drivers of each loudspeaker of one or more loudspeakers as an estimated radiation resistance; or estimating a radiation impedance of each driver of the one or more drivers of each loudspeaker of the one or more loudspeakers as an estimated radiation impedance, wherein said estimated radiation impedance of said driver has estimated information on the radiation resistance of said driver, and obtaining the one or more audio output channels by processing each audio input channel of the one or more audio input channels depending on the estimated radiation resistance or depending on the estimated radiation impedance of each of the one or more drivers of each of the one or more loudspeakers, wherein to estimate the estimated radiation resistance or the estimated radiation impedance of each driver of the one or more drivers of each loudspeaker of the one or more loudspeakers, estimating the estimated radiation resistance or the estimated radiation impedance is conducted depending on estimated sound pressure information indicating an estimation of sound pressure at said driver of said loudspeaker, and depending on estimated velocity information indicating an estimation of a driver velocity of said driver of said loudspeaker.

According to another embodiment, a method may have the steps of: estimating a first radiation resistance of each driver of one or more drivers of each loudspeaker of one or more loudspeakers as a first estimated radiation resistance before a first point in time; or estimating a first radiation impedance of each driver of the one or more drivers of each loudspeaker of the one or more loudspeakers as a first estimated radiation impedance before the first point in time, wherein said first estimated radiation impedance of said driver has estimated information on the first radiation resistance of said driver; wherein to estimate the first estimated radiation resistance or the first estimated radiation impedance of each driver of the one or more drivers of each loudspeaker of the one or more loudspeakers, estimating the first estimated radiation resistance or the first estimated radiation impedance is conducted depending on first estimated sound pressure information indicating an estimation of sound pressure at said driver of said loudspeaker before the first point in time, and depending on first estimated velocity information indicating an estimation of a first driver velocity of said driver of said loudspeaker before the first point in time; estimating a second radiation resistance of each driver of the one or more drivers of each loudspeaker of the one or more loudspeakers as a second estimated radiation resistance after a second point in time; or estimating a second radiation impedance of each driver of the one or more drivers of each loudspeaker of the one or more loudspeakers as a second estimated radiation impedance after the second point in time, wherein said second estimated radiation impedance of said driver has estimated information on the second radiation resistance of said driver, wherein the second point in time occurs after the first point in time; wherein to estimate the second estimated radiation resistance or the second estimated radiation impedance of each driver of the one or more drivers of each loudspeaker of the one or more loudspeakers, estimating the second estimated radiation resistance or the second estimated radiation impedance is conducted depending on second estimated sound pressure information indicating an estimation of sound pressure at said driver of said loudspeaker after the second point in time, and depending on second estimated velocity information indicating an estimation of a second driver velocity of said driver of said loudspeaker after the second point in time; and determining and outputting whether the apparatus is in a first state or whether the apparatus is in a second state depending on a radiation resistance difference indicating a difference between the second estimated radiation resistance and the first estimated radiation resistance, or depending on a radiation impedance difference indicating a difference between the second estimated radiation impedance and the first estimated radiation impedance, wherein the second state indicates that the apparatus is malfunctioning or that the apparatus has been relocated, and wherein the first state indicates that the apparatus is functioning and that the apparatus has not been relocated.

Still another embodiment may have a non-transitory digital storage medium having stored thereon a computer program for performing any of the above inventive methods when said computer program is run by a computer.

An apparatus for processing an audio input signal comprising one or more audio input channels to obtain an audio output signal comprising one or more audio output channels according to an embodiment is provided. The apparatus comprises an estimation unit configured to estimate a radiation resistance of each driver of one or more drivers of each loudspeaker of one or more loudspeakers as an estimated radiation resistance; or configured to estimate a radiation impedance of each driver of the one or more drivers of each loudspeaker of the one or more loudspeakers as an estimated radiation impedance, wherein said estimated radiation impedance of said driver comprises estimated information on the radiation resistance of said driver. Moreover, the apparatus comprises a processing unit configured to obtain the one or more audio output channels by processing each audio input channel of the one or more audio input channels depending on the estimated radiation resistance or depending on the estimated radiation impedance of each of the one or more drivers of each of the one or more loudspeakers. To estimate the estimated radiation resistance or the estimated radiation impedance of each driver of the one or more drivers of each loudspeaker of the one or more loudspeakers, the estimation unit is configured to estimate the estimated radiation resistance or the estimated radiation impedance depending on estimated sound pressure information indicating an estimation of sound pressure at said driver of said loudspeaker, and depending on estimated velocity information indicating an estimation of a driver velocity of said driver of said loudspeaker.

Moreover, a method for processing an audio input signal comprising one or more audio input channels to obtain an audio output signal comprising one or more audio output channels according to an embodiment is provided. The method comprises:

- Estimating a radiation resistance of each driver of one or more drivers of each loudspeaker of one or more loudspeakers as an estimated radiation resistance; or estimating a radiation impedance of each driver of the one or more drivers of each loudspeaker of the one or more loudspeakers as an estimated radiation impedance, wherein said estimated radiation impedance of said driver comprises estimated information on the radiation resistance of said driver. And:
- Obtaining the one or more audio output channels by processing each audio input channel of the one or more audio input channels depending on the estimated radiation resistance or depending on the estimated radiation impedance of each of the one or more drivers of each of the one or more loudspeakers.

To estimate the estimated radiation resistance or the estimated radiation impedance of each driver of the one or more drivers of each loudspeaker of the one or more loudspeakers, estimating the estimated radiation resistance or the estimated radiation impedance is conducted depending on estimated sound pressure information indicating an estimation of sound pressure at said driver of said loudspeaker, and depending on estimated velocity information indicating an estimation of a driver velocity of said driver of said loudspeaker.

Furthermore, an apparatus comprising an estimation unit is provided. The estimation unit is configured to estimate a first radiation resistance of each driver of one or more drivers of each loudspeaker of one or more loudspeakers as a first estimated radiation resistance before a first point in time; or is configured to estimate a first radiation impedance of each driver of the one or more drivers of each loudspeaker of the one or more loudspeakers as a first estimated radiation impedance before the first point in time, wherein said first estimated radiation impedance of said driver comprises estimated information on the first radiation resistance of said driver. To estimate the first estimated radiation resistance or the first estimated radiation impedance of each driver of the one or more drivers of each loudspeaker of the one or more loudspeakers, the estimation unit is configured to estimate the first estimated radiation resistance or the first estimated radiation impedance depending on first estimated sound pressure information indicating an estimation of sound pressure at said driver of said loudspeaker before the first point in time, and depending on first estimated velocity information indicating an estimation of a first driver velocity of said driver of said loudspeaker before the first point in time. Moreover, the estimation unit is configured to estimate a second radiation resistance of each driver of the one or more drivers of each loudspeaker of the one or more loudspeakers as a second estimated radiation resistance after a second point in time; or is configured to estimate a second radiation impedance of each driver of the one or more drivers of each loudspeaker of the one or more loudspeakers as a second estimated radiation impedance after the second point in time, wherein said second estimated radiation impedance of said driver comprises estimated information on the second radiation resistance of said driver. The second point in time occurs after the first point in time. To estimate the second estimated radiation resistance or the second estimated radiation impedance of each driver of the one or more drivers of each loudspeaker of the one or more loudspeakers, the estimation unit is configured to estimate the second estimated radiation resistance or the second estimated radiation impedance depending on second estimated sound pressure information indicating an estimation of sound pressure at said driver of said loudspeaker after the second point in time, and depending on second estimated velocity information indicating an estimation of a second driver velocity of said driver of said loudspeaker after the second point in time. Furthermore, the estimation unit is configured to determine and to output whether the apparatus is in a first state or whether the apparatus is in a second state depending on a radiation resistance difference indicating a difference between the second estimated radiation resistance and the first estimated radiation resistance, or depending on a radiation impedance difference indicating a difference between the second estimated radiation impedance and the first estimated radiation impedance. The second state indicates that the apparatus is malfunctioning or that the apparatus has been relocated. The first state indicates that the apparatus is functioning and that the apparatus has not been relocated.

Moreover, a method is provided. The method comprises:

- Estimating a first radiation resistance of each driver of one or more drivers of each loudspeaker of one or more loudspeakers as a first estimated radiation resistance before a first point in time; or estimating a first radiation impedance of each driver of the one or more drivers of each loudspeaker of the one or more loudspeakers as a first estimated radiation impedance before the first point in time, wherein said first estimated radiation impedance of said driver comprises estimated information on the first radiation resistance of said driver; wherein to estimate the first estimated radiation resistance or the first estimated radiation impedance of each driver of the one or more drivers of each loudspeaker of the one or more loudspeakers. Estimating the first estimated radiation resistance or the first estimated radiation impedance is conducted depending on first estimated sound pressure information indicating an estimation of sound pressure at said driver of said loudspeaker before the first point in time, and depending on first estimated velocity information indicating an estimation of a first driver velocity of said driver of said loudspeaker before the first point in time.

Estimating a second radiation resistance of each driver of the one or more drivers of each loudspeaker of the one or more loudspeakers as a second estimated radiation resistance after a second point in time; or estimating a second radiation impedance of each driver of the one or more drivers of each loudspeaker of the one or more loudspeakers as a second estimated radiation impedance after the second point in time, wherein said second estimated radiation impedance of said driver comprises estimated information on the second radiation resistance of said driver; wherein to estimate the second estimated radiation resistance or the second estimated radiation impedance of each driver of the one or more drivers of each loudspeaker of the one or more loudspeakers. The second point in time occurs after the first point in time. Estimating the second estimated radiation resistance or the second estimated radiation impedance is conducted depending on second estimated sound pressure information indicating an estimation of sound pressure at said driver of said loudspeaker after the second point in time, and depending on second estimated velocity information indicating an estimation of a second driver velocity of said driver of said loudspeaker after the second point in time. And:

Determining and outputting whether the apparatus is in a first state or whether the apparatus is in a second state depending on a radiation resistance difference indicating a difference between the second estimated radiation resistance and the first estimated radiation resistance, or depending on a radiation impedance difference indicating a difference between the second estimated radiation impedance and the first estimated radiation impedance, wherein the second state indicates that the apparatus is malfunctioning or that the apparatus has been relocated, and wherein the first state indicates that the apparatus is functioning and that the apparatus has not been relocated.

Furthermore, a computer program is provided, which is configured to implement one of the above-described methods when being executed on a computer or signal processor.

BRIEF DESCRIPTION OF THE DRAWINGS

In the following, embodiments of the present invention are described in more detail with reference to the figures, in which.

DETAILED DESCRIPTION OF THE INVENTION

Figure 1:
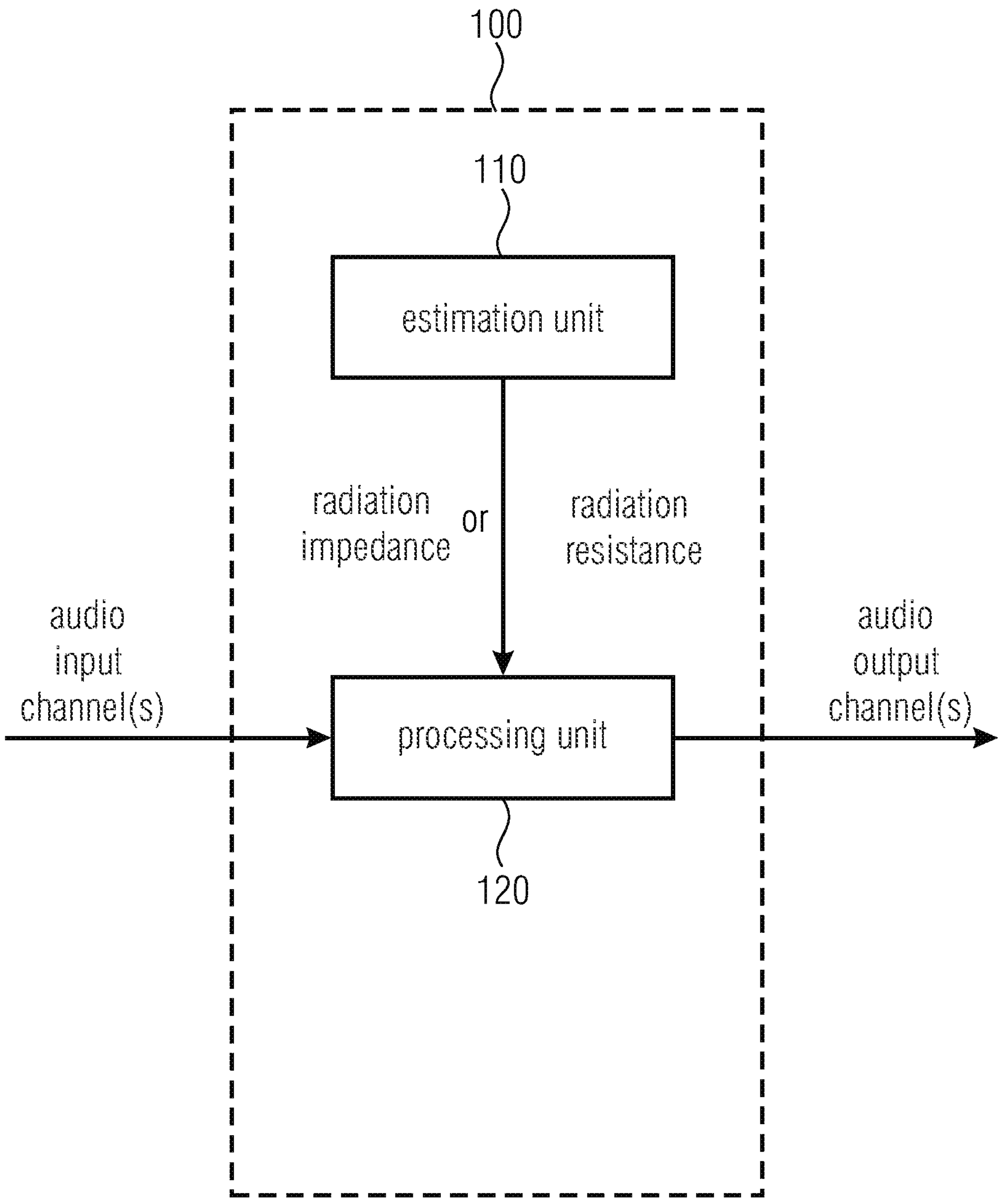
FIG. 1 illustrates an apparatus according to an embodiment.

FIG. 1 illustrates an apparatus 100 for processing an audio input signal comprising one or more audio input channels to obtain an audio output signal comprising one or more audio output channels according to an embodiment.

The apparatus 100 comprises an estimation unit 110. The estimation unit 110 is configured to estimate a radiation resistance of each driver of one or more drivers of each loudspeaker of one or more loudspeakers as an estimated radiation resistance; or is configured to estimate a radiation impedance of each driver of the one or more drivers of each loudspeaker of the one or more loudspeakers as an estimated radiation impedance. Said estimated radiation impedance of said driver comprises estimated information on the radiation resistance of said driver.

Moreover, the apparatus 100 comprises a processing unit 120 configured to obtain the one or more audio output channels by processing each audio input channel of the one or more audio input channels depending on the estimated radiation resistance or depending on the estimated radiation impedance of each of the one or more drivers of each of the one or more loudspeakers.

To estimate the estimated radiation resistance or the estimated radiation impedance of each driver of the one or more drivers of each loudspeaker of the one or more loudspeakers, the estimation unit 110 is configured to estimate the estimated radiation resistance or the estimated radiation impedance depending on estimated sound pressure information indicating an estimation of sound pressure at said driver of said loudspeaker, and depending on estimated velocity information indicating an estimation of a driver velocity of said driver of said loudspeaker.

For example, the one or more audio output channels may, e.g., be one or more loudspeaker signals that, for example, may, e.g., be fed into one or more loudspeakers.

For example, a radiation impedance of a driver may, e.g., be represented in a complex domain, e.g., by a plurality of complex values (e.g., elements of $\mathbb{C}$). A radiation resistance of a driver may, e.g., be represented in a real domain, e.g., by a plurality of real values (e.g., elements of $\mathbb{R}$). For example, for each complex value of a plurality of complex values of the radiation impedance a driver, the real part (in contrast to the imaginary part) of said complex value may, e.g., represent the information on the radiation resistance that is provided by said complex value. Or, in other words, if a plurality of complex values represent the information on the radiation impedance, the real parts of the plurality of complex values may, e.g., represent the information on the radiation resistance.

In some of the embodiments, each of the one or more audio input channels and/or the one or more audio output signals may, e.g., be one or more (traditional/ordinary) audio channel signals.

In some other embodiments, each of the one or more audio input channels and/or the one or more audio output signals may, e.g., be one or more audio object signals.

In some further embodiments, the one or more audio input channels and/or the one or more audio output channels may, e.g., comprise at least one traditional/ordinary audio channel signal and at least one audio object signal.

The one or more audio object signals and/or the at least one audio object signal mentioned before may, for example, be one or more Spatial Audio Object Coding (SAOC) object signals.

In some other embodiments, at least one of the one or more audio input channels and/or the one or more audio output signals may, e.g., comprise scene based audio information.

In some embodiments, a loudspeaker may, e.g., comprise a transducer to convert electric signals into sound. Such a transducer (of a specific building-type) may, e.g., comprise a cone/diaphragm. Such a transducer may, e.g., be built into an enclosure.

Thus, according to some embodiments, a loudspeaker may, e.g., comprise a transducer and an enclosure.

In some embodiments, a driver may, e.g., be implemented as a moving diaphragm of a transducer.

According to some embodiments, the one or more loudspeakers mentioned here and/or the one or more microphones mentioned here may, e.g., be installed in a soundbar, in a smart speaker, in a TV, in a laptop, in a single loudspeaker system.

In some embodiments at least one of the one or more loudspeakers may, e.g., be a subwoofer.

According to an embodiment, the one or more microphones may, e.g., be spaced apart from said loudspeaker or spaced apart from said driver of said loudspeaker.

In an embodiment, to estimate the estimated radiation resistance or the estimated radiation impedance of said driver of said loudspeaker, the estimation unit 110 may, e.g., be configured to estimate the estimated radiation resistance or the estimated radiation impedance by estimating estimated sound pressure information indicating an estimation of sound pressure at said driver of said loudspeaker, and/or by estimating estimated velocity information indicating an estimation of a driver velocity of said driver of said loudspeaker.

In an embodiment, the estimation unit 110 may, e.g., be configured to estimate the estimated sound pressure information such that the estimated sound pressure information is represented in a spectral domain; and/or the estimation unit 110 may, e.g., be configured to estimate the estimated velocity information such that the estimated velocity information is represented in the spectral domain. Moreover, the estimation unit 110 may, e.g., be configured to estimate the estimated radiation resistance or the estimated radiation impedance of said driver of said loudspeaker such that the estimated radiation resistance or the estimated radiation impedance of said driver of said loudspeaker is represented in the spectral domain.

In an embodiment, the estimation unit 110 may, e.g., be configured to estimate the estimated sound pressure information depending on a sound pressure $P_{m_3}$ at a microphone of the one or more microphones.

According to an embodiment, the estimation unit 110 may, e.g., be configured to estimate the estimated velocity information depending on a current through a loudspeaker driver coil of said driver of said loudspeaker.

In an embodiment, the estimation unit 110 may, e.g., be configured to estimate the estimated velocity information depending on an electrical resistance $R_e$, a coil inductance $L_e$, a force factor Bl, a mechanical mass M, a total stiffness K, a mechanical resistance $R_m$. v indicates the cone velocity/driver velocity.

According to an embodiment, the estimation unit 110 may, e.g., be configured to determine the estimated velocity information depending on an equation system, being defined according to:

$$\begin{bmatrix} \dot{I} \\ \dot{x} \\ \dot{v} \end{bmatrix} = \begin{bmatrix} -R_e/L_e & 0 & -Bl/L_e \\ 0 & 0 & 1 \\ Bl/M & -K/M & -R_m/M \end{bmatrix} \begin{bmatrix} I \\ x \\ v \end{bmatrix} + \begin{bmatrix} 1/L_e \\ 0 \\ 0 \end{bmatrix} u(t)$$

wherein u(t) indicates an excitation signal, wherein t indicates time, wherein x indicates an axial displacement of the loudspeaker diaphragm of said loudspeaker, wherein I indicates the current through the loudspeaker driver coil of said driver of said loudspeaker, wherein the notation ˙ represents the first-order derivative with respect to time.

In an embodiment, the estimation unit 110 may, e.g., be configured to solve the equation system using a fourth-order Runge-Kutta method.

According to another embodiment, the estimated velocity information may, e.g., be stored within the apparatus 100.

In an embodiment, the estimated velocity information may, e.g., be stored in a look-up table which is stored within the apparatus 100. The estimation unit 110 may, e.g., be configured to derive the estimated velocity information from the look-up table.

According to an embodiment, the estimation unit 110 may, e.g., be configured to determine linear parameters of said driver of said loudspeaker by solving a minimization problem/an optimization problem to estimate the estimated radiation resistance or the estimated radiation impedance of said driver of said loudspeaker. E.g., the linear parameters may, e.g., be used for modelling as described herein.

In an embodiment, the estimation unit 110 may, e.g., be configured to use said estimated sound pressure information to estimate said estimated velocity information.

According to an embodiment, the estimation unit 110 may, e.g., be configured to employ $$\dot{v} = -\frac{1}{\rho}\nabla p$$

wherein $\dot{v}$ is a time derivative of the estimated velocity information, wherein ∇ is a gradient operator, wherein p is the estimated sound pressure information in the time domain, wherein ρ is a medium density.

For example, p may, e.g., indicate the pressure information in the time domain; whereas P may, e.g., indicate the pressure information in the spectral domain, e.g., frequency domain.

In an embodiment, the processing unit 120 may, e.g., be configured to determine a difference between the estimated radiation resistance of said driver of said loudspeaker and a predefined radiation resistance. The processing unit 120 may, e.g., be configured to process the one or more audio input channels depending on the difference between the estimated radiation resistance of said driver of said loudspeaker and the predefined radiation resistance.

According to an embodiment, the processing unit 120 may, e.g., be configured to modify a spectral shape of at least one of the one or more audio input channels depending on the difference between the estimated radiation resistance of said driver of said loudspeaker and the predefined radiation resistance to obtain the one or more audio output signals.

In an embodiment, the processing unit 120 may, e.g., be configured to determine a spectral modification factor for each spectral band of a plurality of spectral bands depending on the difference between the estimated radiation resistance of said driver of said loudspeaker and the predefined radiation resistance for said spectral band. For each audio input channel of the one or more audio input channels, to obtain one of the one or more audio output channels, the processing unit 120 may, e.g., be configured to apply the spectral modification factor of each spectral band of the plurality of spectral bands, on said spectral band of said audio input channel.

According to an embodiment, the processing unit 120 may, e.g., be configured to determine the difference between the estimated radiation resistance of said driver of said loudspeaker and the predefined radiation resistance according to $$H_{raw}(\omega) = \sqrt{\frac{R_r^{(ref)}(\omega)}{R_r(\omega)}}$$

wherein $H_{raw}(\omega)$ indicates said difference, wherein $R_r(\omega)$ indicates the estimated radiation resistance, wherein $R_r^{(ref)}(\omega)$ indicates the predefined radiation resistance, wherein ω indicates an angular frequency.

In an embodiment, the processing unit 120 may, e.g., be configured to apply a smoothing operation on said difference being an unprocessed filter prototype to obtain a smoothed filter prototype. Moreover, the processing unit 120 may, e.g., be configured to apply the smoothed filter prototype on at least one of the one or more audio input channels to obtain at least one of the one or more audio output channels.

According to an embodiment, the processing unit 120 may, e.g., be configured to apply a global equalizer on at least one of the one or more audio input channels to obtain at least one intermediate signal. Moreover, the processing unit 120 may, e.g., be configured to determine a relative sound power in a spectral domain from the estimated radiation resistance or from the estimated radiation impedance. Furthermore, the processing unit 120 may, e.g., be configured to determine one or more peaks (e.g., one or more local maxima) within the relative sound power in the spectral domain. Moreover, the processing unit 120 may, e.g., be configured to apply a further equalizer on the at least one intermediate signal depending on the one or more peaks within the relative sound power in the spectral domain to obtain at least one of the one or more audio output channels.

In an embodiment, the estimation unit 110 may, e.g., be configured to estimate the estimated sound pressure information depending on captured sound pressure information recorded by one or more microphones.

According to an embodiment, the one or more microphones are two or more microphones. The estimation unit 110 may, e.g., be configured to receive the captured sound pressure information from the two or more microphones. Moreover, the estimation unit 110 may, e.g., be configured to use the captured sound pressure information from only one of the two or more microphones to determine the estimated sound pressure information. Furthermore, the estimation unit 110 may, e.g., be configured to not use the captured sound pressure information from the other microphones of the two or more microphones to determine the estimated sound pressure information.

In an embodiment, the one or more microphones are two or more microphones. The estimation unit 110 may, e.g., be configured to receive the captured sound pressure information from the two or more microphones. Moreover, the estimation unit 110 may, e.g., be configured to determine an average or a weighted average of the captured sound pressure information from the two or more microphones, and to determine the estimated sound pressure information using the average or the weighted average of the captured sound pressure information.

For example, if there are two sound pressure values $p_1$ and $p_2$, the average may, e.g., be: $a=0.5p_1+0.5p_2$; and the weighted average $a_w$ with weights $w_1$ and $w_2$ may, e.g., be $a_w=w_1p_1+w_2\ p_2$. For example $0<w_1<1$ and $w_2=1-w_1=$.

For example, if there are three sound pressure values p, and $p_2$ and $p_3$, the average may, e.g., be: $a=\frac{1}{3}\ p_1+\frac{1}{3}\ p_2+\frac{1}{3}\ p_3$; and the weighted average a, with weights $w_1$ and $w_2$ and $w_3$ may, e.g., be $a_w=w_1\ p_1+w_2\ p_2+w_3\ p_3$. For example $0<w_1<1$; $0<w_2<1$; $0<w_1+w_2<1$ and $w_3=1-w_1-w_2$.

According to an embodiment, the one or more microphones may, e.g., be two or more microphones. The one or more loudspeakers may, e.g., be two or more loudspeakers and/or at least one of the one or more loudspeakers may, e.g., comprise two or more drivers. The estimation unit 110 may, e.g., be configured to receive the captured sound pressure information from the two or more microphones. Moreover, the estimation unit 110 may, e.g., be configured to determine, for each driver of the one or more drivers of each loudspeaker of the one or more loudspeakers, a weighted average of the captured sound pressure information from the two or more microphones, and to determine the estimated sound pressure information using the weighted average of the captured sound pressure information, wherein the estimation unit 110 may, e.g., be configured to determine said weighted average depending on a plurality of weights, wherein each weight of the plurality of weights depends on a position of said driver and depends on a position of each of the two or more microphones.

According to an embodiment, the one or more microphones may, e.g., be two or more microphones. The one or more loudspeakers may, e.g., be two or more loudspeakers and/or at least one of the one or more loudspeakers may, e.g., comprise two or more drivers. For each driver of the one or more drivers of the one or more loudspeakers, the estimation unit 110 may, e.g., be configured to select one of the two or more microphones as a selected microphone. For said driver, the estimation unit 110 may, e.g., be configured to use the captured sound pressure information from the selected microphone to determine the estimated sound pressure information. Moreover, for said driver, the estimation unit 110 may, e.g., be configured to not use the captured sound pressure information from the other microphones of the two or more microphones to determine the estimated sound pressure information.

In an embodiment, the estimation unit 110 may, e.g., be configured to determine the estimated sound pressure information using a complex transfer function.

According to an embodiment, the estimation unit 110 may, e.g., be configured to determine the estimated sound pressure information depending on $P \approx P_{m_3}/H$, wherein P indicates the estimated sound pressure information, wherein $P_{m_3}$ indicates the captured sound pressure information, wherein H indicates the complex transfer function being defined as $$H(\omega) = \frac{P_{rec}}{P_{src}}$$

wherein ω indicates an angular frequency, (for example, $\omega \in \mathbb{R}$), wherein $P_{src}$ indicates an imposed sound pressure at said loudspeaker, wherein $P_{rec}$ indicates an estimated/simulated sound pressure at said one of the one or more microphones that is present when the sound pressure $P_{src}$ exists at the loudspeaker. $P_{src}$ and $P_{rec}$ may, e.g., be obtained from an acoustic model.

In an embodiment, for each driver of the one or more drivers of the one or more loudspeakers, the estimation unit 110 may, e.g., be configured to select one of the two or more microphones as a selected microphone depending on a position of said driver and depending on a position of each of the two or more microphones.

According to an embodiment, the one or more audio input channels may, e.g., be two or more audio input channels, and the one or more audio output channels may, e.g., be two or more audio output channels. The processing unit 120 may, e.g., be configured to obtain at least two of the two or more audio output channels by determining, depending on the estimated radiation resistance or depending on the estimated radiation impedance of at least one of the one or more drivers of each of the one or more loudspeakers, individual modification information for each audio input channel of the at least two of the two or more audio input channels; and by applying the individual modification information for each audio input channel of the at least two of the two or more audio input channels on said audio input channel.

Thus, in such an embodiment, different audio input channels are treated differently. For example, it may be desirable for a 5.1 audio input signal to enhance bass frequencies for the LFE channel, and to reduce bass in other channels.

Such, if the estimated radiation resistance indicates e.g. that the positioning of the loudspeaker results in a boost of bass frequencies, this could e.g. beneficially be preserved for an LFE or subwoofer channel, while it would be reduced for the other channels.

Moreover, it is not always desirable to suppress room acoustic properties. Some audio input channels may, e.g., be modified such that room acoustic properties are beneficially be taken into account.

For example, sometimes, it may be useful to enhance or boost high-frequency audio components, e.g., that are reproduced using one or more tweeters, instead of reducing low-frequency/bass audio components, as such a strategy may, e.g., result in a more impressive sound experience, or e.g. because the loudspeaker can such produce an overall higher level/gain while the defined adaption of the frequency curve still follows a defined target.

Moreover, different drivers of a loudspeaker can be intended/optimized for different frequency ranges, for example, woofers, full-range drivers, tweeters, etc.

This differentiation can be taken into account in the design of the one or more reference curves, e.g., the one or more target curves, defined targets. And/or, this differentiation can be taken into account in the design of the one or more targets.

According to an embodiment, at least one of the one or more microphones 300 is not located on a main radiation direction of any of the one or more loudspeakers 200.

In an embodiment, at least one of the one or more microphones 300 has not a direct line of sight to any of the one or more loudspeakers 200.

According to an embodiment, for each microphone of the one or more microphones, a predefined distance between said microphone and the loudspeaker may, e.g., be at least 10 centimetres, e.g., at least 20 centimetres, e.g., at least 50 centimetres, e.g., at least 1 meter. Even with these distances, the concepts of the invention still work, e.g., due to the provided estimation concepts.

According to an embodiment, the estimation unit 110 may, e.g., be configured to update the estimated radiation resistance or the estimated radiation impedance of the one or more drivers of the one or more loudspeakers at/during initialization and/or when requested and at/during runtime.

For example, the estimated radiation resistance or the estimated radiation impedance may, e.g., be estimated, when the apparatus is moved in a listening environment, e.g., in a room, and may, e.g., also be periodically updated (and not only at initialization).

In an embodiment, the estimated radiation resistance is a first estimated radiation resistance before a first point in time, or the estimated radiation impedance is a first estimated radiation impedance before the first point in time. The estimation unit 110 may, e.g., be configured to estimate a second radiation resistance of each driver of the one or more drivers of each loudspeaker of the one or more loudspeakers as a second estimated radiation resistance after a second point in time; or is configured to estimate a second radiation impedance of each driver of the one or more drivers of each loudspeaker of the one or more loudspeakers as a second estimated radiation impedance after the second point in time, wherein said second estimated radiation impedance of said driver comprises estimated information on the second radiation resistance of said driver. The second point in time occurs after the first point in time. To estimate the second estimated radiation resistance or the second estimated radiation impedance of each driver of the one or more drivers of each loudspeaker of the one or more loudspeakers, the estimation unit 110 may, e.g., be configured to estimate the second estimated radiation resistance or the second estimated radiation impedance depending on second estimated sound pressure information indicating an estimation of a second sound pressure at said driver of said loudspeaker, and depending on second estimated velocity information indicating an estimation of a second driver velocity of said driver of said loudspeaker. Moreover, the estimation unit 110 may, e.g., be configured to determine and to output whether the apparatus 100 is in a first state or whether the apparatus 100 is in a second state depending on a radiation resistance difference indicating a difference between the second estimated radiation resistance and the first estimated radiation resistance, or depending on a radiation impedance difference indicating a difference between the second estimated radiation impedance and the first estimated radiation impedance. The second state indicates that the apparatus 100 is malfunctioning or that the apparatus 100 has been relocated. The first state indicates that the apparatus 100 is functioning and that the apparatus 100 has not been relocated.

According to an embodiment, the estimation unit 110 may, e.g., be configured to estimate the second estimated sound pressure information depending on captured second sound pressure information recorded by the one or more microphones; and/or the estimation unit 110 may, e.g., be configured to estimate the second estimated velocity information depending on a second current through the loudspeaker driver coil of said driver of said loudspeaker after the second point in time.

In an embodiment, additionally other means, for example, from one or more gyroscopes, or other information that has been gathered from the pressure measurement, may, e.g., also be used as an indication that the device has been moved.

Figure 2:
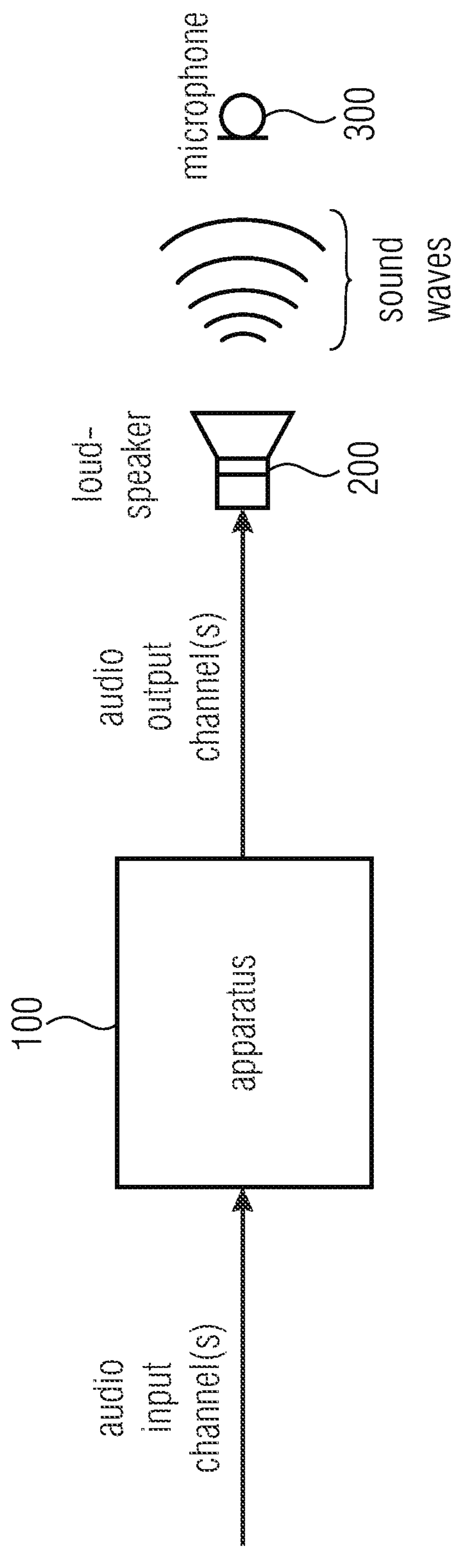
FIG. 2 illustrates a system according to an embodiment.

FIG. 2 illustrates a system according to an embodiment. The system comprises the apparatus 100 as described above with respect to FIG. 1 and the loudspeaker 200 referred to above. The loudspeaker 200 is configured to output at least one of the one or more audio output channels.

In an embodiment, the system may, e.g., further comprise the one or more microphones 300 referred to above.

In the following, further concepts and further embodiments of the present invention are provided.

According to some of the embodiments, the microphone does not have to be positioned close to or in front of the loudspeaker diaphragm to measure the sound pressure.

In some of the embodiments, it may, e.g., be assumed that at least one microphone is present somewhere on the enclosure of the loudspeaker. The at least one microphone may, e.g., also be close by the loudspeaker, as long as the setup is known, so that the sound transmission (path) can be simulated from the diaphragm to the at least one microphone. By including insight from simulations of that specific arrangement, the sound pressure that exists close to the diaphragm can be inferred.

Some of the embodiments may, e.g., not need sound pressure gradient measurements (using two microphones) or accelerometer measurements to measure the volume velocity.

In some of the embodiments, the volume velocity may, e.g., be estimated based on an electro-mechanical model of the loudspeaker. This model is fed with the output of a voltage/current measurement that is gained at the loudspeaker ports during operation.

Some of the embodiments provide concepts that can automatically adapt the playback performance of an audio reproduction system to a playback environment. This automatic adaption of the playback system may, e.g., happen in form of an, e.g., automatic, calibration of the timbral characteristics of the playback system to be best suited for the current listening environment and loudspeaker position.

Usually, during the design, manufacturing, tuning of a new device, the geometry of the enclosure and the arrangement of the transducers (sources and receivers, for example, (drivers of) loudspeakers and/or microphones) are known. Some of the embodiments may, e.g., use these known properties to achieve a beneficial method of calibrating a sound system in an environment.

According to some of the embodiments, estimation (via simulation) of acoustic quantities that are used to compute the radiation impedance of a loudspeaker in a room may, e.g., be conducted. In contrast, previous methods relied on measurement of the needed parameters.

In some of the embodiments, a concept is provided to estimate the radiation resistance, or rather the sound pressure and velocity, which has advantages compared to the state of the art, when used for specific classes of reproduction devices.

Some of the embodiments use one or more modeling approaches, and the necessity of using a specific microphone to measure the sound pressure close to the membrane, as well as the necessity of using two microphones or other sophisticated tools or setups to measure the velocity are made obsolete.

In some of the embodiments, the microphones may, e.g., not be directly in front of the diaphragm. For example, the microphones may, e.g., be farther away than a few centimeters from the diaphragm.

In contrast to the known technology, some of the embodiments only need a sound pressure estimate in one point.

Some of the embodiments may, e.g., not need an accelerometer, and some of the embodiments may, e.g., not need to move the microphone and may, e.g., not have to be close to the diaphragm.

In the following, details and ideas of particular embodiments of the present invention are described.

At first, details of radiation impedance calculation and radiation resistance calculation are provided.

The radiation impedance Z(ω) is given by the ratio of the sound pressure at the driver P(ω) to the normal velocity of the driver V(ω), as follows:

$$Z(\omega) = C\frac{P(\omega)}{V(\omega)}, \quad (1)$$

wherein C is a constant related to the area of the driver diaphragm.

Figure 3:
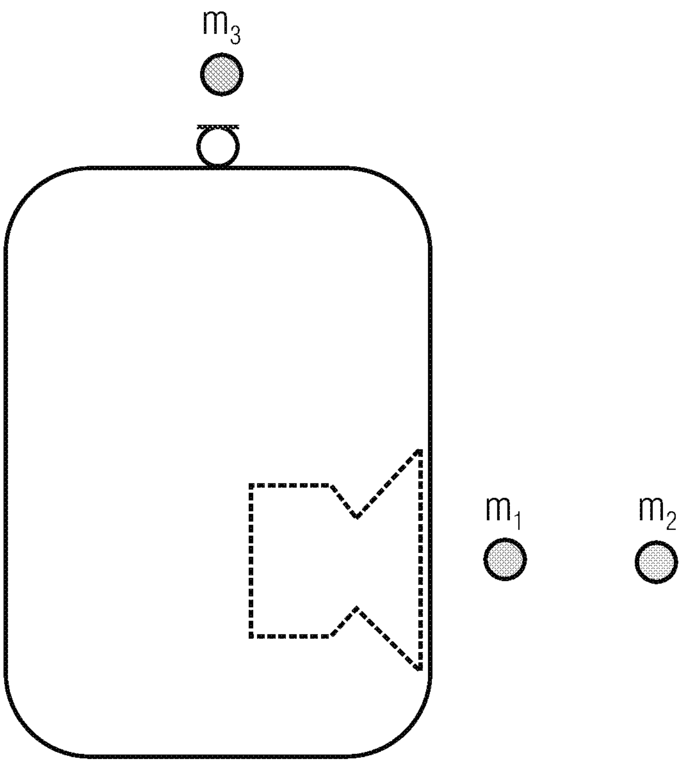
FIG. 3 illustrates a loudspeaker of an example with an indication of three different measurement positions.

FIG. 3 illustrates a loudspeaker of an example with an indication of three different (sound pressure) measurement positions. Inter alia, FIG. 3 shows a two point measurement by $m_1$ and $m_2$, where $m_1$ and $m_2$ positioned closely in front of the speaker diaphragm correspond to the two microphones/the two measurement positions.

In other embodiments not depicted by FIG. 3, two or more microphones are used, where one microphone is positioned inside the loudspeaker enclosure. An accelerometer is placed on the loudspeaker diaphragm.

Returning to FIG. 3, the sound pressure at the driver surface is given (approximately), as indicated in FIG. 3, by the sound pressure $P_{m_1}$ measured at position $m_1$, or by the sound pressure $P_{m_2}$ measured at position $m_2$, or by an average of $P_{m_1}$ and $P_{m_2}$. An approximate normal velocity $\tilde{V}$ can be computed from the sound pressure $P_{m_1}$ measured at position $m_1$ and the sound pressure $P_{m_2}$ measured at position $m_2$, using formula $$\tilde{V} \approx \frac{i}{\omega\rho}\left(\frac{P_{m_2} - P_{m_1}}{x_{m_2} - x_{m_1}}\right), \quad (2)$$

wherein ω is the angular frequency, ρ is the medium density, i is the imaginary unit, and x is the axial distance from the center of the driver diaphragm (in particular, $x_{m_1}$ is the axial distance at position $m_1$ from the center of the driver diaphragm; $x_{m_2}$ is the axial distance at position $m_2$ from the center of the driver diaphragm).

The radiation impedance Z is calculated using $$Z \approx C\frac{P_{m_1}}{\tilde{V}}. \quad (3)$$

Thus, the acoustic quantities that may, e.g., to be estimated to compute the (acoustic) radiation impedance of a loudspeaker in a closed room are, e.g., the loudspeaker driver's axial velocity, V, and the acoustic/sound pressure, P, at the driver's surface.

In some of the embodiments, the current through the loudspeaker driver coil, and the acoustic/sound pressure at a single point external to the loudspeaker enclosure, are measured and used as input data for the estimation of V and P. Here, "external to the loudspeaker enclosure" may, e.g., refer to a microphone that is advantageously positioned at a known and fixed position at or very close to the loudspeakers enclosure, so that the known properties of the transducer and position can be included in the simulation.

The driver velocity and the sound pressure are not directly measured close to the driver. Instead, those values are estimated/approximated. To estimate the velocity, a (lumped) electro-mechanical parameter model is used.

To estimate the pressure, an acoustic model is used.

The acoustic models can e.g. be wave base methods like FEM (Finite Element Method), FDM (Finite Difference Method), BEM (Boundary Element Method), or in the most simple case only a (crude) spherical wave model assumption.

The sound pressure may, e.g., be modeled based on the distance (e.g., radius r) from the diaphragm, e.g., based on $$P(r, \omega) = Q(\omega)\frac{e^{-ikr}}{r}, \quad (4)$$

where k is the wave number, and Q(ω) is the source signal; or based on $$P(r, \omega) = Q(\omega)\frac{e^{-ikr}}{ar} \quad (5)$$

where k is the wave number, Q(ω) is the source signal, and a is a term that takes into account e.g. geometrical spreading, directivity of the drivers, room acoustics that have an influence on the damping behavior. For example, $a \in \mathbb{R}$.

In other words, in some of the embodiments, the measured current through the loudspeaker driver coil and/or the acoustic/sound pressure at a single point may, e.g., be used as input data for an electro-mechanical model and/or an acoustic model respectively, to gain approximations/estimates of V, and/or P, respectively.

Some models or methods that are used to estimate the estimated velocity may introduce errors that have an effect on the estimated phase of the estimated velocity. To avoid the introduction of such errors, possible solutions include choosing more detailed models, or more accurate numerical methods.

However, in an embodiment, this problem may, e.g., be advantageously be avoided by assuming that the phases of the particle velocity and the acoustic pressure at the driver are related, for example, according to the continuity of momentum:

$$\dot{v} = -\frac{1}{\rho}\nabla p \quad (6)$$

where ρ is the medium density.

According to an embodiment, the phase of the velocity may, e.g., be estimated from the phase of the estimated pressure.

In a particular embodiment, in addition to what has been described before, the estimated pressure may, e.g., be used to further refine the estimated velocity, for example, such that, the estimation of the velocity does not only depend on the measured current, but may, e.g., additionally depend on information gained from the estimated pressure. This yields refined estimates of the estimated radiation impedance and/or radiation resistance.

Figure 4:
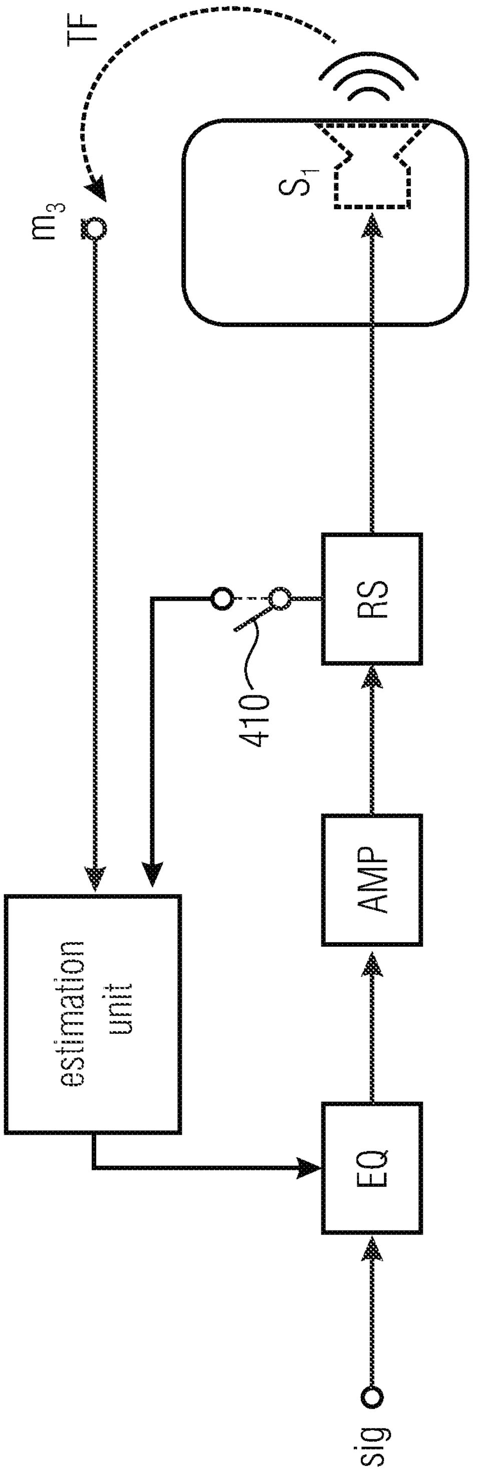
FIG. 4 depicts a high-level illustration of an embodiment.

FIG. 4 depicts a high-level illustration of an embodiment.

The block RS represents a device to measure the current out of the amplifier/flowing through the driver coil.

This can be achieved by measuring the voltage drop across a resistor, e.g. a shunt resistor.

If switch 410 is switched on, the current, measured by the block RS, is fed into an estimation unit to estimate the radiation impedance or the radiation resistance. If the switch

410 is switched off, the measured current is not fed into the estimation unit, and no estimation of the radiation impedance or the radiation resistance takes place.

TF is the transfer path/transfer function from the diaphragm S1 to the microphone $m_3$ (see FIG. 3), which is simulated to gain an estimate of the sound pressure in front of S1.

In the estimation unit, the measured current and the measured sound pressure are fed to the electro-mechanical model and the acoustical model to give estimates of V and P, respectively. Based on those, the radiation impedance or the radiation resistance is calculated to perform global equalization based on a comparison to a theoretical reference curve or a pre-defined (reference) curve.

Figure 5:
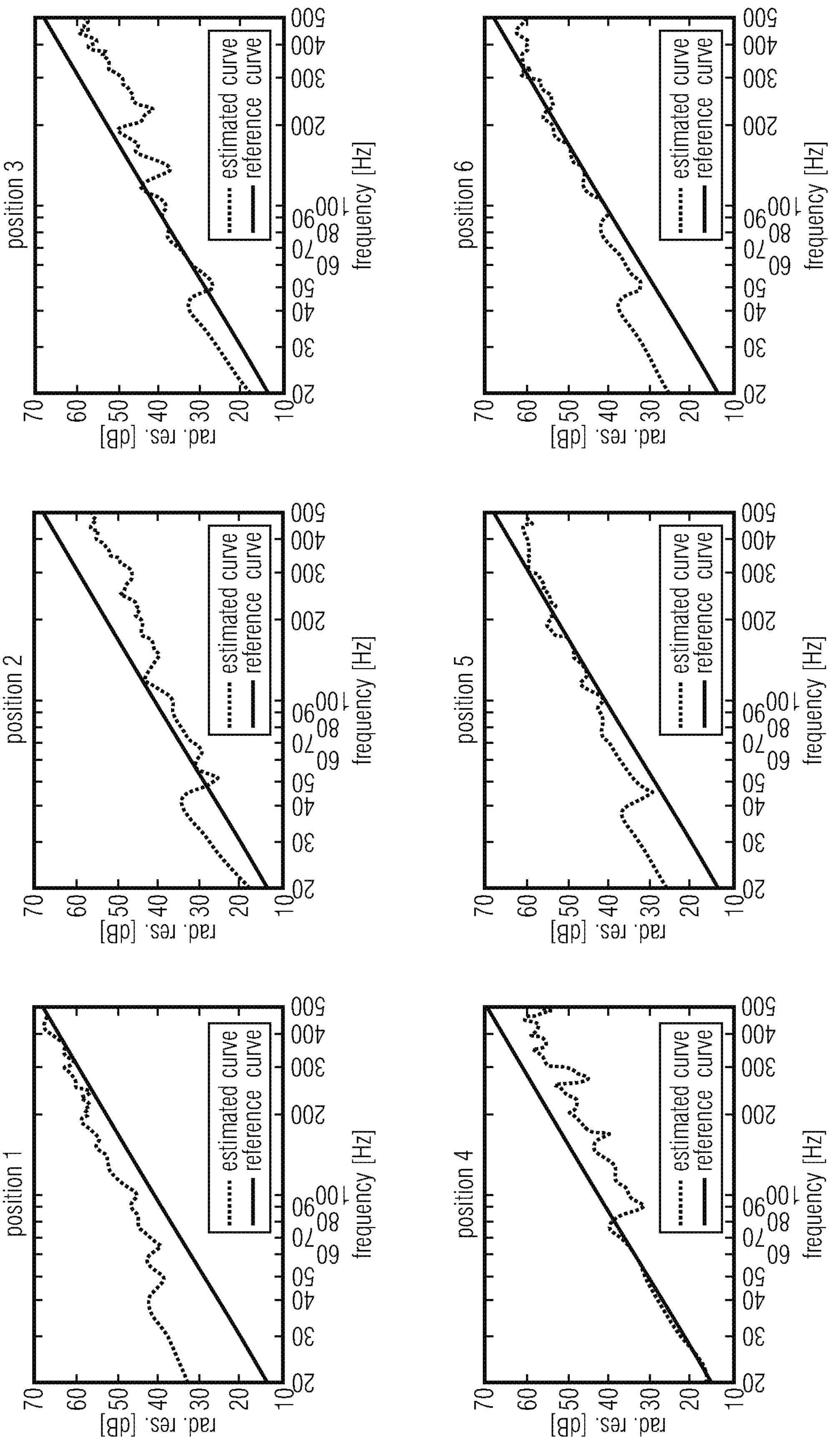
FIG. 5 illustrates some example real world results for a specific loudspeaker in different positions in the same room according to embodiments.

FIG. 5 illustrates some example real world results of estimated radiation resistances for a specific loudspeaker in different positions in the same room, in relation to the theoretical radiation resistance (predefined radiation resistance) according to embodiments.

Instead of the theoretical radiation impedance curve, any other reference curve may, e.g., be defined, based on which the desired equalizer (EQ) settings may, e.g., be calculated.

The EQ that may, e.g., be used to compensate for the room effects may, e.g., then be based on a comparison of the estimated radiation impedance to, for example, the theoretical radiation impedance; or based on a comparison of the estimated radiation resistance to, e.g., the theoretical radiation resistance.

In some of the embodiments, smoothed versions of the estimated radiation resistance may, e.g., be used to calculate compensation filter curves.

In a particular embodiment, a reference radiation resistance curve $R_r^{(ref)}(\omega)$ may, e.g., be selected to perform global equalization by comparing the estimated radiation resistance to a target curve, which may be either pre-defined (e.g. a modeled one) or a theoretical one. For instance, a free-field radiation resistance formula may be used for this purpose, which may, for example, be defined as:

$$R_r^{(ref)}(\omega) = \frac{\rho}{4\pi c}\omega^2 S^2, \tag{7}$$

where S is the diaphragm area of the loudspeaker and c is the speed of sound.

Figure 6:
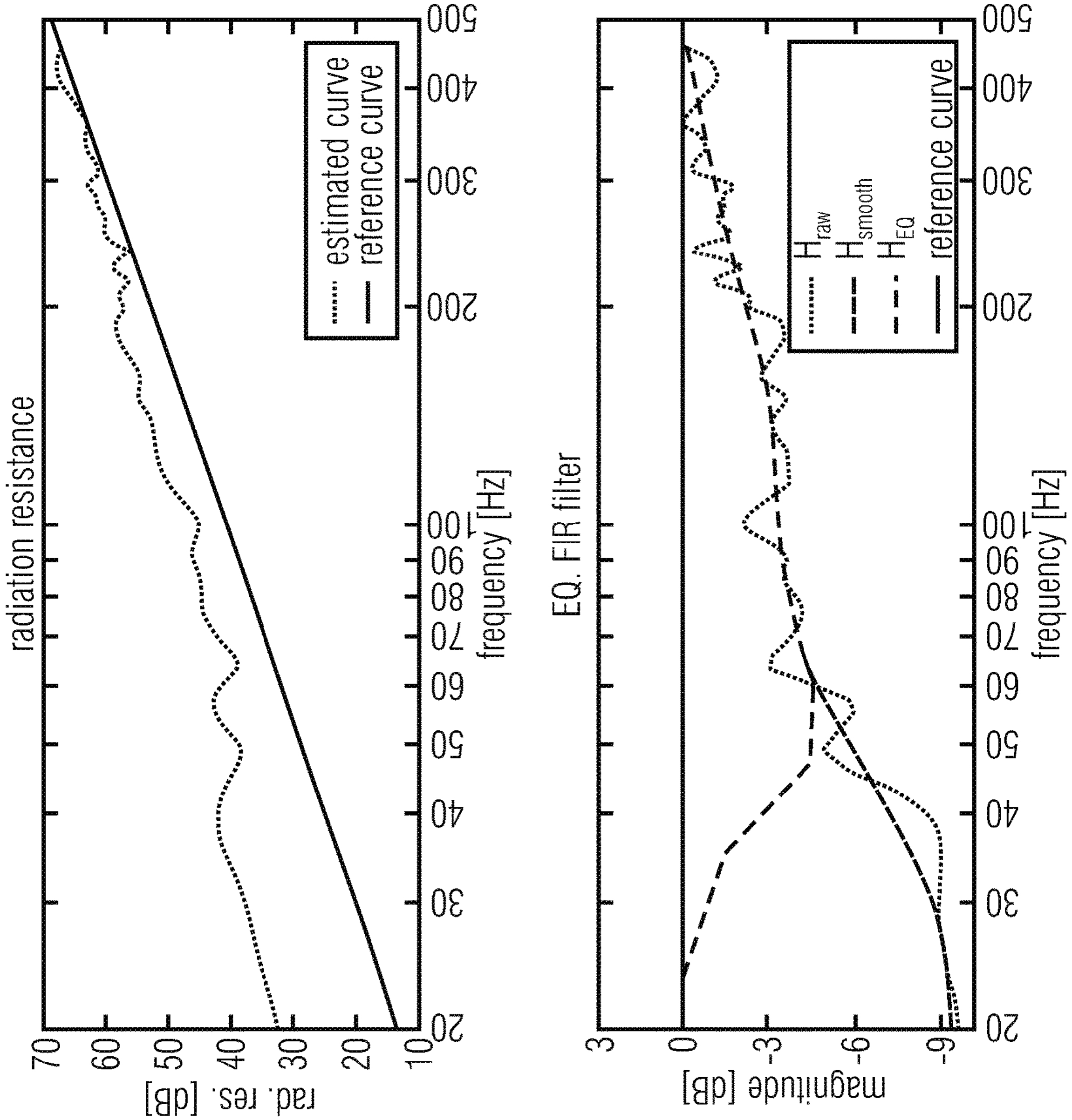
FIG. 6 illustrates the magnitude-response of the global equalization filter after interpolation according to a specific example, and further illustrates band limiting for a specific example.

FIG. 6 shows a real-world example of a radiation resistance estimation in comparison to the free-field reference curve, and the calculated global equalization filter, for a loudspeaker which has been positioned at the corner of a room.

The initial unprocessed filter prototype $H_{raw}(\omega)$ for global equalization may, for example, be computed according to:

$$H_{raw}(\omega) = \sqrt{\frac{R_r^{(ref)}(\omega)}{R_r(\omega)}}. \tag{8}$$

For example, a smoothed version $H_{smooth}(\omega)$ of this filter curve $H_{raw}(\omega)$ may, e.g., be used to calculate the final compensation filter, which may, for example, be obtained by smoothing methods, for example, by using octave-band smoothing. The smoothed version of the filter for the specific example is also shown in FIG. 6, where a 1-octave-band smoothing was applied.

In an embodiment, the frequency resolution may, e.g., be chosen, and may, e.g., be kept unchanged throughout the EQ (equalizer) filter computation.

In another embodiment, to match a pre-defined number of FIR filter taps, interpolation may, e.g., be applied to the smoothed filter, resulting in a coarser frequency resolution.

According to an embodiment, a frequency limiter may, for example, also be applied to restrict the equalization into a specified frequency range. Frequency limiting may, according to an embodiment, for example, be implemented by applying a bandpass filter to the magnitude-response of the EQ filter.

Here, FIG. 6 illustrates the magnitude-response of the global equalization filter after interpolation (number of filter taps: N=4096) according to a specific example, and further illustrates band limiting (40 Hz↔500 Hz) $H_{EQ}(\omega)$ that may, e.g., be applied in the specific example.

The phase-response of the FIR filter $H_{EQ}(\omega)$ may, for example, be obtained through the computation of the cepstrum to realize a minimum-phase version. The FIR filter taps $h_{EQ}(n)$ may, for example, be computed by taking the inverse fast Fourier transform (IFFT), for example, according to:

$$h_{EQ}(n) = \mathrm{IFFT}\{H_{EQ}(\omega)\}. \tag{9}$$

In a further embodiment, the EQ generation may be conducted in another way compared to the EQ generation described above. Such a further embodiment is particular advantageous, if the radiation impedance estimation in a specific room reveals specific problematic frequencies in the low frequency region that stick out, which are often called dominant modes. Such dominant modes can appear if unfavorable combinations of room dimension are present, that boost specific frequencies excessively strong, and/or if the loudspeaker is placed in a position where it excites specific room modes.

Since such excitation of specific room modes leads to audible ringing/resonance/excessively long decay of specific frequency regions that may influence the listening experience unfavorably, it is advantageous to specifically take care of mitigating those modal effects.

Figure 7:
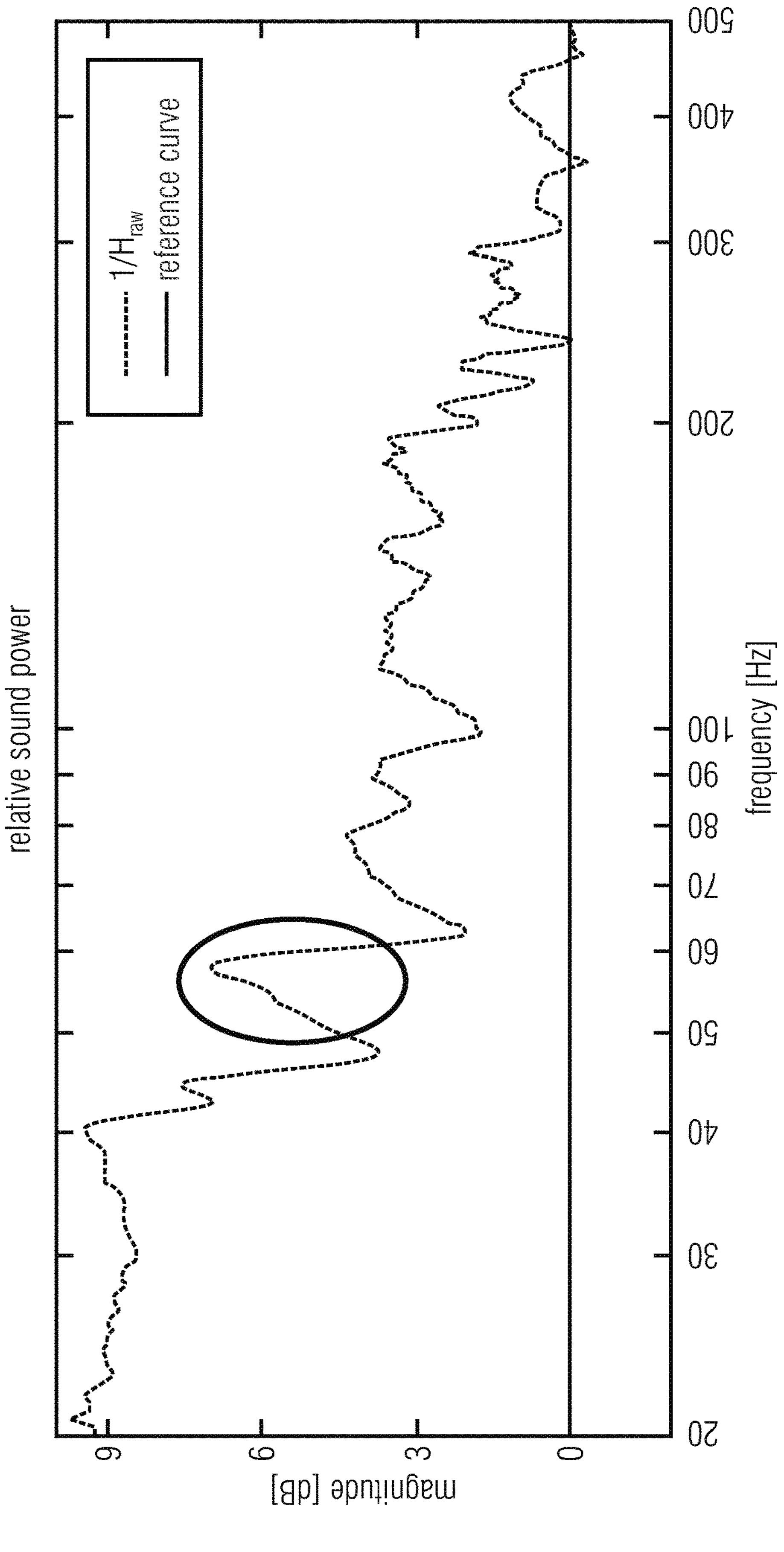
FIG. 7 depicts a high-resolution display of an unprocessed filter prototype according to an embodiment.

As an example, FIG. 7 depicts a high-resolution display of an unprocessed filter prototype according to an embodiment. To better reveal the specific modal issue, in this case, the inverse of the initial unprocessed filter prototype, for example, defined as:

$$1/H_{raw}(\omega) = \sqrt{R_r(\omega)/R_r^{(ref)}(\omega)} \tag{10}$$

indicates the excessive relative sound power in comparison to the reference curve, which is displayed in dB scale.

In the plot of FIG. 7, the described modal behavior can clearly be identified in the region around 57 Hz (indicated by the red circle). To tackle such modal behavior, usually high-Q filters are necessary.

One example of how such a modal behavior equalization could be performed is, e.g., to apply a smoother global EQ as described before in a first stage, and then apply a specific high-Q modal EQ to equalize the specific peaks that were identified in the high frequency resolution analyses.

In another embodiment, the above mentioned modal EQ can be applied using as single loudspeaker to compensate for modal effects.

Multiple loudspeakers can be used to compensate low frequency modal effects in rooms.

A first loudspeaker and at least one additional loudspeaker(s) are positioned in a room, and the modal behavior is controlled by sound fed into the at least one additional loudspeaker(s).

With the method of radiation impedance estimation described herein, such a method using multiple loudspeakers can be beneficially applied, since the necessary identification of the problematic frequency ranges to be equalized can be performed, suitable additional loudspeakers that would be applicable to compensate the detected problematic frequency range(s) can be automatically identified and selected, and a continuous control of the effect of the application of the compensation method can be performed.

Some of the embodiments are implemented such that they are capable of conducting at least one of the above described methods for equalizer generation/equalizer determination.

Further embodiments are implemented such that they are capable of conducting more than one of the above described methods for equalizer generation/equalizer determination, and select one of the methods for equalizer generation/equalizer determination. For example, that one of the methods for equalizer generation/equalizer determination may, e.g., be selected depending on an environment, where the apparatus is used. E.g., one of the methods for equalizer generation/equalizer determination is selected that is most suitable for a particular environment, where the apparatus is used.

Figure 8:
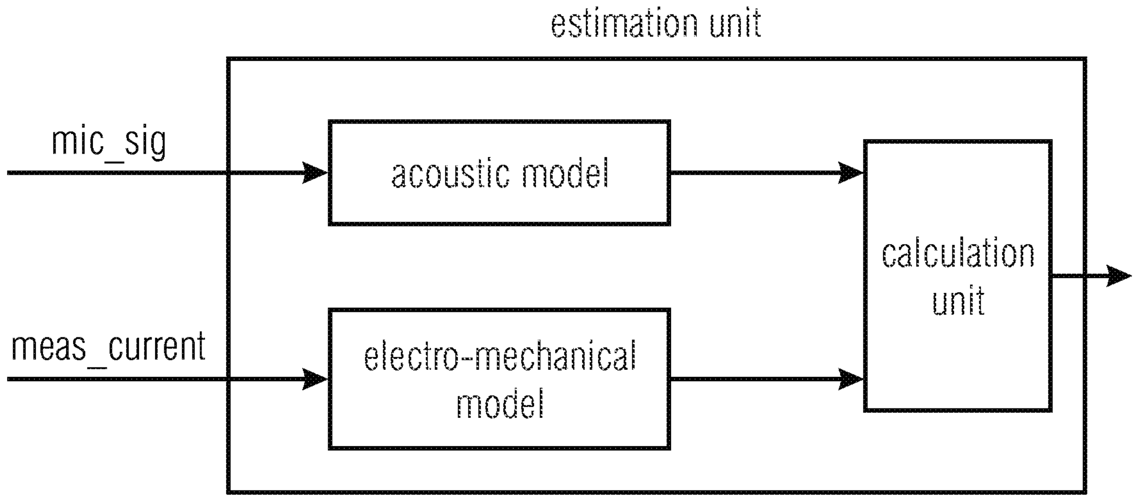
FIG. 8 illustrates a usage of models to estimate the parameters according to an embodiment.

FIG. 8 illustrates a usage of models to estimate the parameters according to an embodiment.

In the following, estimating the driver velocity according to some of the embodiments is described.

Once the current has been measured, using, for example, the voltage drop across a shunt resistor, a model description of the loudspeaker is used to estimate the normal velocity of the driver.

In an embodiment, the velocity may, e.g., be determined by searching for model parameters that minimize the error between the measured and simulated currents.

Different model descriptions of loudspeakers exist. In the following, the estimation process is described based on one exemplifying, specific model. Actually, this model may, for example, be only valid at low frequencies, but for the given application this is sufficient, since, in particular embodiments, only the low frequency behavior may, e.g., be intended to be equalized. In other embodiments, other models may, e.g., similarly be used.

Figure 9:
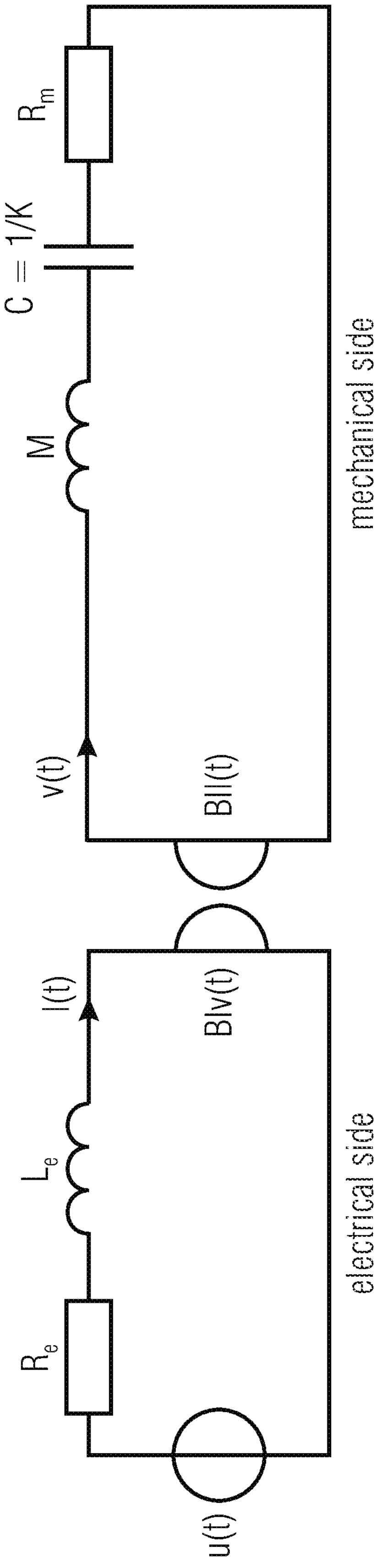
FIG. 9 illustrates a linear lumped parameter model according to an embodiment.

The electro-mechanical (e.g., linear, e.g., lumped) parameter model of a loudspeaker driver, used as an example here, is shown in FIG. 9.

FIG. 9 illustrates a (e.g., linear, e.g., lumped) parameter model according to an embodiment.

The elements on the electrical side (left part of the sketch FIG. 9) are the driving voltage u(t), the electrical resistance $R_e$, the coil inductance $L_e$, and the product of the force factor Bl and the cone velocity v(t).

On the mechanical side (right part of the sketch in FIG. 9), the elements are the product of Bl and the current I, the mechanical mass M, the total stiffness K, and the mechanical resistance $R_m$.

The following two coupled equations describe the model mathematically:

$$u(t) = R_e I + L_e \frac{dI}{dt} + Blv, \tag{11}$$

and $$BlI = Ma + R_m v + Kx, \tag{12}$$

in which the acceleration is given by $$a = \frac{dv}{dt} = \frac{d^2x}{dt^2}. \tag{13}$$

Equations (11) and (12) can be written in State Space representation as:

$$\begin{bmatrix} \dot{I} \\ \dot{x} \\ \dot{v} \end{bmatrix} = \begin{bmatrix} -R_e/L_e & 0 & -Bl/L_e \\ 0 & 0 & 1 \\ Bl/M & -K/M & -R_m/M \end{bmatrix} \begin{bmatrix} I \\ x \\ v \end{bmatrix} + \begin{bmatrix} 1/L_e \\ 0 \\ 0 \end{bmatrix} u(t), \tag{14}$$

where the notation $\dot{}$ represents the first-order derivative with respect to time. x indicates an axial displacement of the loudspeaker diaphragm of said loudspeaker.

The equation system (14) may, e.g., be solved by an appropriate numerical method (e.g., an iterative method), for example the fourth-order Runge-Kutta method.

In another embodiment, a (general) excitation signal, u(t), is used to drive the model. Initial guesses are made for the unknown parameters, $R_e$, $L_e$, Bl, K, M, and $R_m$. The system is solved, and the predicted current is compared to the measured current. To predict the driver's linear parameters, a minimization problem is solved, with cost function $$f(g) = \min\left(\frac{\|I_S - I(g)\|_2}{\|I_S\|_2}\right), \tag{15}$$

where g=<$R_e$, $L_e$, Bl, K, M, $R_m$> is the vector of unknown parameters. The final solution provides the predicted velocity, $V_p(\omega)$. The normal velocity may, e.g., then be given by $V \approx V_p$, wherein $I_S$ is the measured current, I(g) is the simulated current. The linear parameters are predicted by minimizing the difference between the measured and simulated current. The linear parameters do not modify the audio input channel. In other embodiments, other cost functions are employed To estimate the sound pressure at the driver, the wave equation is solved to find the free-field transfer function (TF) from the center of the driver to measurement position $m_3$ (see FIG. 4). Using this transfer function, the sound pressure at the source can be predicted from the measured sound pressure.

Different concepts are available for the acoustic modelling or simulation to generate a model, e.g., of the loudspeaker and the transfer function.

For example, the loudspeaker could be modeled in the free-field, with the assumption that all surfaces of the loudspeaker enclosure are acoustically hard. (More detailed models including boundary conditions of the room, and precise modelling of the loudspeakers surface and material properties would be possible).

Figure 13:
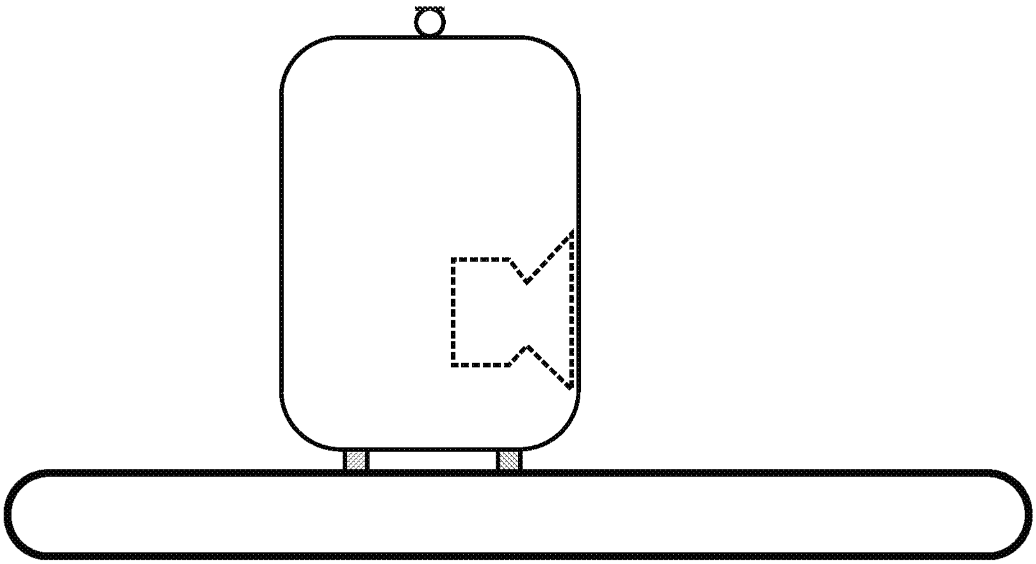
FIG. 13 illustrates an example of a loudspeaker positioned on a surface according to an embodiment.

Also specific situations that may be found in practical scenarios (e.g. positioning of the loudspeaker on a table, on or in a shelf, close to one, two, three boundary surfaces (e.g. close to wall, in a corner, . . . ) may, e.g., be simulated and chosen on the actual situation in the listening environment (either automatic detection/selection, or by user). Also, in some of the embodiments, a simulation of the whole room, e.g. based on additional input data, is employed. (As an example, FIG. 13 depicts a loudspeaker on a surface/table).

A unit sound pressure may, e.g., be imposed at the driver, for a range of relevant input frequencies. The solution at position $m_3$ is recovered. From this solution, a complex transfer function may, e.g., be computed as follows $$H(\omega) = \frac{P_{rec}}{P_{src}}, \tag{16}$$

wherein $P_{src}$ is the sound pressure imposed at the driver, and $P_{rec}$ is the sound pressure received at position $m_3$. The sound pressure used is then given by $P \approx P_{m_3}/H$.

In some of the embodiments, the above-described concepts are not limited to a usage of a single microphone. Instead, microphone arrays with a variable number of microphones in different arrangements (e.g. linear array, circular array, positioned at different surfaces of the loudspeakers enclosure) may, e.g., be used; see, for example, the embodiments illustrated by FIG. 12, FIG. 14, FIG. 15.

According to some of the embodiments, multiple recordings from the different microphones may, e.g., be employed. The one that gives the best recording in the present situation may, e.g., be selected. An average of all recorded signals to arrive at an overall better estimate compared to using only a single recording may, e.g., be calculated.

In some embodiments, the microphone may, for example, be an external microphone (e.g. also one of a mobile phone). For example, the exact model and position during measurement may, e.g., be known and may, e.g., be included in the simulation.

By driving the individual transducers (diaphragms) of a multi-driver-loudspeaker individually with a test signal, more information may, e.g., be gathered about the room (e.g. varying modal behavior).

A parameter model (e.g., a lumped parameter model) may, e.g., be used, and the system may, e.g., be continuously monitored. It may, e.g., be checked, if something in the setup or system behavior changes over time. E.g. a change in the position or environment could be detected.

According to another embodiment, the estimated velocity information (for example, the driver velocity) may, for example, be estimated once, e.g. during the design stage of the system.

For example, according to another embodiment, the estimated velocity information may, e.g., be stored within the apparatus 100.

Such an embodiment, may, for example, be based on the assumption that the magnitude profile of the estimated driver velocity (e.g., the frequency dependent magnitude of the velocity) does not change significantly between rooms, or in different positions within a room.

In an embodiment, the estimation during the design stage may, e.g. be performed by estimating in a laboratory environment the magnitude of the velocity in the complete/relevant (audio) frequency range for the specific loudspeaker or driver in response to e.g. an applied unit voltage or e.g. a known voltage.

The estimated velocity magnitude profile may then, e.g., be stored in a look-up table.

Thus, in an embodiment, the estimated velocity information may, e.g., be stored in a look-up table which is stored within the apparatus 100. The estimation unit 110 may, e.g., be configured to derive the estimated velocity information from the look-up table.

In a linear audio system, a change in the driving voltage level (e.g., the audio input signal level) will result in a linearly proportional change in the driver velocity magnitude.

According to an embodiment, the estimation unit 110 may, e.g., be configured to derive the estimated velocity information from the look-up table using the driving voltage level as an input to the look-up table.

Thus, according to an embodiment, during runtime, the magnitude of the driver velocity could be determined from the driving voltage (and potentially a conversion factor) and the values stored in said look-up table, while the phase of the velocity could be estimated from the estimated pressure information, using the continuity of momentum.

In an embodiment, a kind of 'health check' of the system/drivers may, e.g., be performed. In some embodiments, it may, e.g., be monitored how the driver parameters change with time.

An apparatus comprising an estimation unit 110 is provided.

The estimation unit 110 is configured to estimate a first radiation resistance of each driver of one or more drivers of each loudspeaker of one or more loudspeakers as a first estimated radiation resistance before a first point in time; or is configured to estimate a first radiation impedance of each driver of the one or more drivers of each loudspeaker of the one or more loudspeakers as a first estimated radiation impedance before the first point in time, wherein said first estimated radiation impedance of said driver comprises estimated information on the first radiation resistance of said driver.

To estimate the first estimated radiation resistance or the first estimated radiation impedance of each driver of the one or more drivers of each loudspeaker of the one or more loudspeakers, the estimation unit 110 is configured to estimate the first estimated radiation resistance or the first estimated radiation impedance depending on first estimated sound pressure information indicating an estimation of sound pressure at said driver of said loudspeaker before the first point in time, and depending on first estimated velocity information indicating an estimation of a first driver velocity of said driver of said loudspeaker before the first point in time.

Furthermore, the estimation unit 110 is configured to estimate a second radiation resistance of each driver of the one or more drivers of each loudspeaker of the one or more loudspeakers as a second estimated radiation resistance after a second point in time; or is configured to estimate a second radiation impedance of each driver of the one or more drivers of each loudspeaker of the one or more loudspeakers as a second estimated radiation impedance after the second point in time, wherein said second estimated radiation impedance of said driver comprises estimated information on the second radiation resistance of said driver.

To estimate the second estimated radiation resistance or the second estimated radiation impedance of each driver of the one or more drivers of each loudspeaker of the one or more loudspeakers, the estimation unit 110 is configured to estimate the second estimated radiation resistance or the second estimated radiation impedance depending on second estimated sound pressure information indicating an estimation of sound pressure at said driver of said loudspeaker after the second point in time, and depending on second estimated velocity information indicating an estimation of a second driver velocity of said driver of said loudspeaker after the second point in time.

Furthermore, the estimation unit 110 is configured to determine and to output whether the apparatus is in a first state or whether the apparatus is in a second state depending on a radiation resistance difference indicating a difference between the second estimated radiation resistance and the first estimated radiation resistance, or depending on a radiation impedance difference indicating a difference between the second estimated radiation impedance and the first estimated radiation impedance.

The second state indicates that the apparatus is malfunctioning or that the apparatus has been relocated. The first state indicates that the apparatus is functioning and that the apparatus has not been relocated.

In an embodiment, the estimation unit 110 may, e.g., be configured to estimate the first estimated sound pressure information depending on captured first sound pressure information recorded by one or more microphones before the first point in time, and the estimation unit 110 may, e.g., be configured to estimate the second estimated sound pressure information depending on captured second sound pressure information recorded by one or more microphones after the second point in time. And/or the estimation unit 110 may, e.g., be configured to estimate the first estimated velocity information depending on a first current through a loudspeaker driver coil of said driver of said loudspeaker before the first point in time, and the estimation unit 110 may, e.g., be configured to estimate the second estimated velocity information depending on a second current through the loudspeaker driver coil of said driver of said loudspeaker after the second point in time.

In an embodiment, the estimation unit 110 may, e.g., be configured to determine the radiation resistance difference by determining a difference value indicating a difference between the second estimated radiation resistance and the first estimated radiation resistance; or is configured to determine the radiation impedance difference by determining a difference value indicating a difference between the second estimated radiation impedance and the first estimated radiation impedance. The estimation unit 110 may, e.g., be configured to determine that the apparatus is in the second state, if the difference value is greater than a threshold value. Moreover, the estimation unit 110 may, e.g., be configured to determine that the apparatus is in the first state, if the difference value is smaller than or equal to the threshold value.

In an embodiment, additionally other means, for example, from one or more gyroscopes, or other information that has been gathered from the pressure measurement, may, e.g., also be used as an indication that the device has been moved.

In some of the embodiments, a global EQ estimate from two different (or more) (spatially separated) loudspeakers may, e.g., be employed to get a better estimate of global EQ/of the room behavior.

In a particular embodiment, information gained from multiple loudspeakers may, e.g., be used to conduct modal equalization. Based on the actual position(s) of multiple loudspeakers and the estimated modal behavior, it may, for example, be checked, if an improvement in the reproduction in the modal frequency range can be achieved, and/or if one or more loudspeakers may, e.g., be used to compensate for modal effects of the other loudspeaker/room combinations.

In some of the embodiments, simulations that are used to estimate the sound pressure at the diaphragm may, for example, also include simulations of the surroundings to get better estimates. Those surroundings may, e.g., later be set by the user. Or, those surroundings may, e.g., be detected automatically. E.g. if the loudspeaker is positioned on a flat solid surface (e.g. a table), it will behave differently than in a bookshelf.

Figure 10:
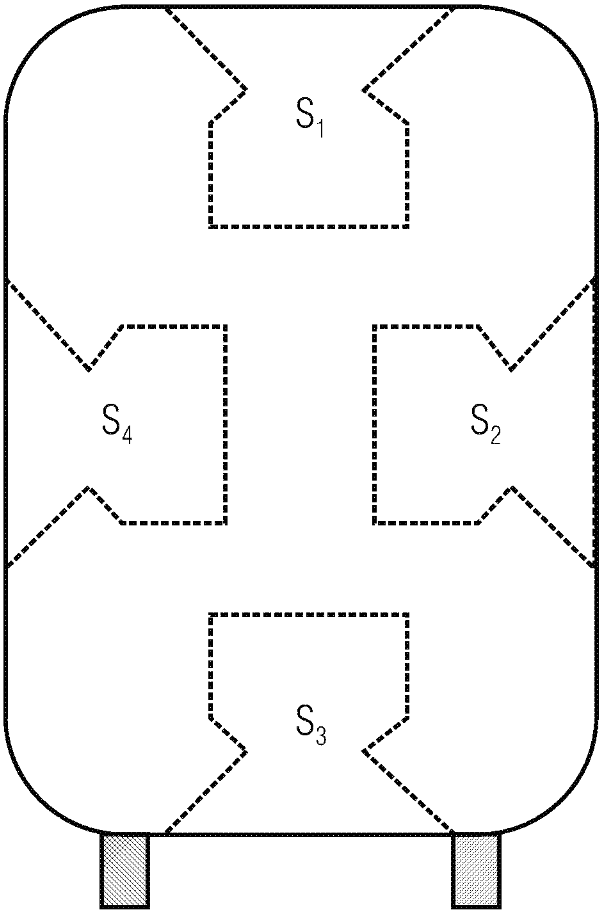
FIG. 10 illustrates a side view of an alternative loudspeaker layout with drivers/transducers at four sides according to an embodiment.

FIG. 10 illustrates a side view of an alternative loudspeaker layout with drivers/transducers at four sides according to an embodiment.

Figure 11:
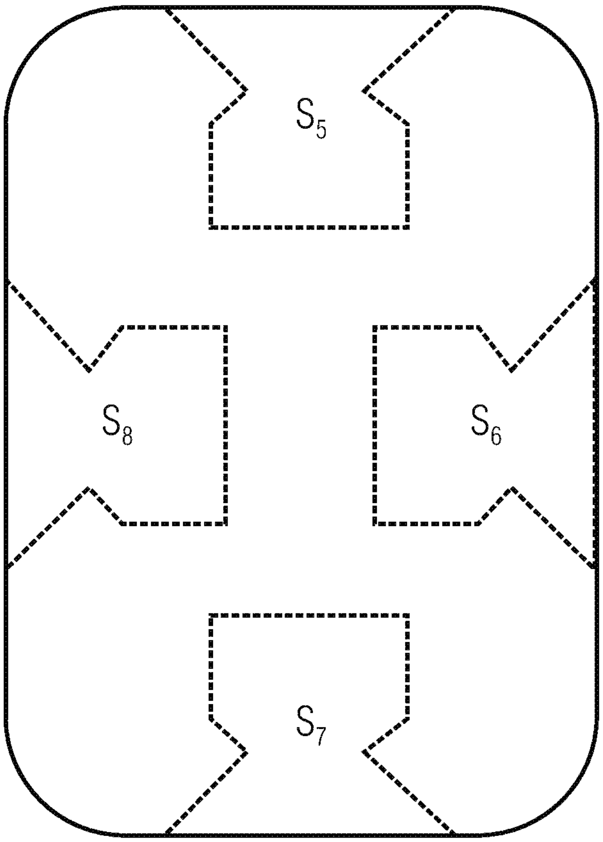
FIG. 11 illustrates a top view of an alternative loudspeaker layout with drivers/transducers at four sides according to an embodiment.

FIG. 11 illustrates a top view of an alternative loudspeaker layout with drivers/transducers at four sides according to an embodiment.

Figure 12:
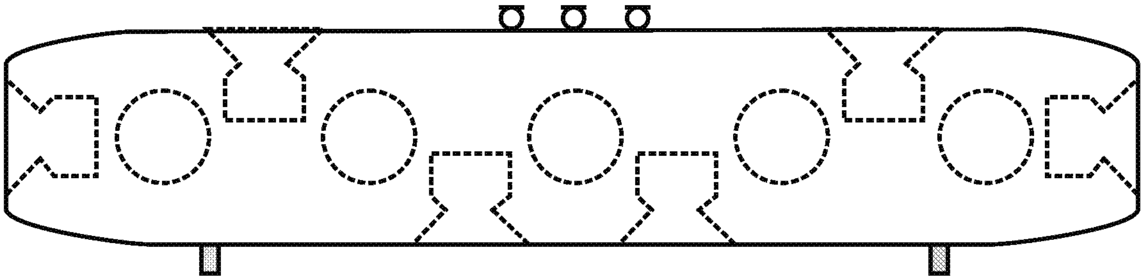
FIG. 12 illustrates an alternative loudspeaker layout being a soundbar-type with multiple microphones according to an embodiment.

FIG. 12 illustrates an alternative loudspeaker layout being a soundbar-type with multiple microphones according to an embodiment.

FIG. 13 illustrates an example of a loudspeaker positioned on a surface (e.g. table) according to an embodiment.

Figure 14:
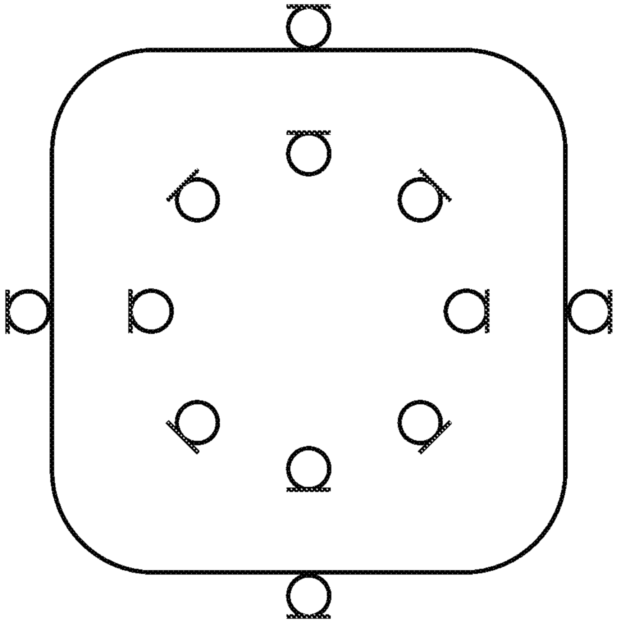
FIG. 14 illustrates a top view of a loudspeaker showing potential positions for single or multiple microphones according to an embodiment.

FIG. 14 illustrates a top view of a loudspeaker showing potential positions for single or multiple microphones according to an embodiment.

Figure 15:
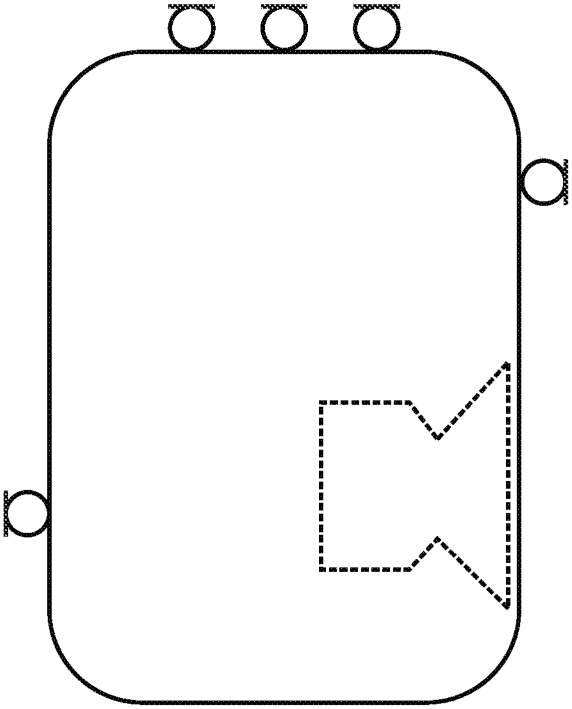
FIG. 15 illustrates a side view of a loudspeaker showing potential positions for single or multiple microphones according to an embodiment.

FIG. 15 illustrates a side view of a loudspeaker showing potential positions for single or multiple microphones according to an embodiment.

Figure 16:
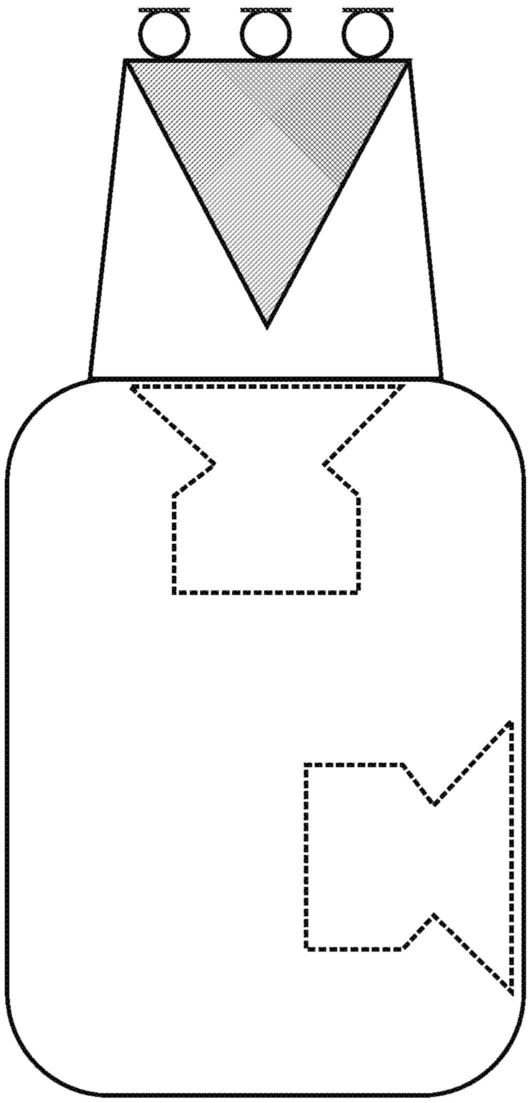
FIG. 16 illustrates another side view of a loudspeaker showing potential positions for single or multiple microphones according to another embodiment.

FIG. 16 illustrates another side view of a loudspeaker showing potential positions for single or multiple microphones according to another embodiment.

In some embodiments it might be useful to place additional structures on the actual loudspeaker enclosure, as, e.g., means to diffuse the sound of some loudspeakers, e.g., loudspeakers firing upwards, by means of diffusors, spreaders, conic structures, diffusing cones, waveguides, etc., or other shapes to spread the sound in specific directions, e.g. horizontally, or in specific directions.

In such cases, the microphones can beneficially be placed on top of such structures, as exemplified in FIG. 16.

In the following, further embodiments are provided.

In some of the embodiments, the performance of a loudspeaker in a room is controlled. The needed control parameters are (instead of being directly measured) estimated based on measurements of easily obtainable parameters. Those measured parameters are input parameters for at least one model that approximates the needed control parameters.

According to an embodiment, one of the models is an acoustic model, for example, an acoustic model to approximate the sound pressure at the diaphragm.

In an embodiment, one of the models is a simple plane wave approximation.

According to an embodiment, one of the models is a (detailed) wave based method, for example, a Finite Element Simulation. In an embodiment, a modelling of one or more properties of the specific loudspeaker may, e.g., be employed.

In an embodiment, the model to predict the sound pressure is a (simple) spherical wave approximation. For example, if the distance between a measurement point in front of a woofer, and the actual measurement point remote, for example, within a limited range of e.g. a few 10s of centimeters from the woofer is known, then the sound pressure at the woofer, e.g., in the low frequency region, can be computed/approximated from the remote measurement. The approximation that can be computed assumes sound to propagate as a spherical wave, and just takes into account the distance of the measurement point from the woofer. This approximation can be termed "spherical wave approximation".

According to an embodiment, one of the models may, e.g., be an electro-mechanical model, for example, to approximate the velocity based on a current measurement.

In an embodiment, one of the easily obtainable parameters is a sound pressure measurement, which, e.g., does not have to be captured close to the diaphragm. For example, one or more microphones that conduct the sound pressure measurement can be (one or more) built in microphone(s) of a smart speaker, or, for example, a playback system that already features microphones for interaction, for example, with a voice-assistant.

According to an embodiment, each driver/transducer of a loudspeaker which comprises multiple drivers/transducers may, e.g., be used individually to select the best suited driver in the given situation, or, may, e.g., be used to calculate an average of all used drivers to enhance the result.

In an embodiment, a specific test signal may, e.g., be used for calibrating the system. In another embodiment, instead, the played program material (e.g. music) may, e.g., be used for calibrating the system.

According to an embodiment, instead of a specific test signal, a special voice assistant phrase may, e.g., be used as test signal.

In an embodiment, the calibration may, e.g., be conducted at a specific instant in time (that, for example, may, e.g., be triggered by a user, e.g. after moving the loudspeaker).

According to another embodiment, instead of doing the calibration at a specific instant in time, the system may, e.g., conduct continuous adaption to the environment.

In an embodiment, the system may, e.g., only conduct a new calibration, if a change in the environment/setup position has been recognized.

According to an embodiment, the one or more loudspeakers may, e.g., be a first loudspeaker. The one or more drivers of the first loudspeaker may, e.g., be a first driver of the first loudspeaker. The estimation unit 110 may, e.g., be configured to estimate the radiation resistance of the first driver of the first loudspeaker as the estimated radiation resistance; or may, e.g., be configured to estimate the radiation impedance of the first driver of the first loudspeaker as the estimated radiation impedance.

In an embodiment, the one or more audio input channels may, e.g., be a first input channel, wherein the one or more audio output channels may, e.g., be a first output channel for the first driver. The processing unit 120 may, e.g., be configured to determine a first filter for the first driver depending on the estimated radiation resistance or depending on the estimated radiation impedance. Moreover, the processing unit 120 may, e.g., be configured to apply the first filter for the first driver on the first input channel to obtain the first output channel for the first driver.

According to an embodiment, the processing unit 120 may, e.g., be configured to determine a further filter for each further driver of one or more further drivers of each further loudspeaker of one or more further loudspeakers depending on the first filter for the first driver. The processing unit 120 may, e.g., be configured to apply the further filter of each further driver of the one or more further drivers of each further loudspeaker of the one or more further loudspeakers on a further input signal of one or more further input signals to obtain a further output signal of one or more further output signals for said further driver.

In an embodiment, the processing unit 120 may, e.g., be configured to determine a global equalization filter by determining the further filter for at least one of the one or more further drivers of at least one of the one or more further loudspeakers, wherein the processing unit (120) may, e.g., be configured to employ an initial unprocessed filter curve of the first driver for the one or more further drivers to obtain a smoothed filter curve for the at least one of the one or more further drivers.

According to an embodiment, the processing unit 120 may, e.g., be configured to determine the further filter for the at least one of the one or more further drivers of the at least one of the one or more further loudspeakers by employing frequency limiting to restrict an equalization into a frequency range for the at least one of the one or more further drivers.

In an embodiment, the estimation unit 110 may, e.g., be configured to estimate two or more radiation resistances or two or more radiation impedances for two or more drivers of the one or more loudspeakers. The processing unit 120 may, e.g., be configured to determine two or more unprocessed filter curves for the two or more drivers depending on the two or more radiation resistances or the two or more radiation impedances. Moreover, the processing unit 120 may, e.g., be configured to determine a weighted-average filter curve by determining a weighted average of the two or more unprocessed filter curves, or is configured to determine a smoothed weighted-average filter curve by determining a smoothed weighted average of the two or more unprocessed filter curves. Furthermore, the processing unit 120 may, e.g., be configured to apply the weighted-average filter curve, or the smoothed weighted-average filter curve, or a filter curve derived from the weighted-average filter curve or from the smoothed weighted-average filter curve, on an audio input signal of the one or more audio input signals to obtain an audio output signal of the one or more audio output signals for a different driver being different from the two or more drivers.

In some of the embodiments, the estimated radiation resistance or impedance of a single driver may be used to compute the global equalization filter for one or more further drivers. This may be achieved by using the initial unprocessed filter prototype $H_{raw}(\omega)$ of said single driver for the one or more further drivers to obtain a smoothed version $H_{smooth}(\omega)$ of this filter curve $H_{raw}(\omega)$ at the same or individual smoothing rates for each driver, for example, by using the same or individual octave-band smoothing. A frequency limiter may, for example, also be applied to restrict the equalization into a frequency range specified as the same or individually for one or more drivers. Frequency limiting may, according to an embodiment, for example, be implemented by applying a bandpass filter to the magnitude-response of the equalizer filter.

In an embodiment, a weighted average of $H_{raw}(\omega)$ and/or $H_{smooth}(\omega)$ of two or more drivers may also be used to compute the global equalization filter for one or more drivers.

Figure 17:
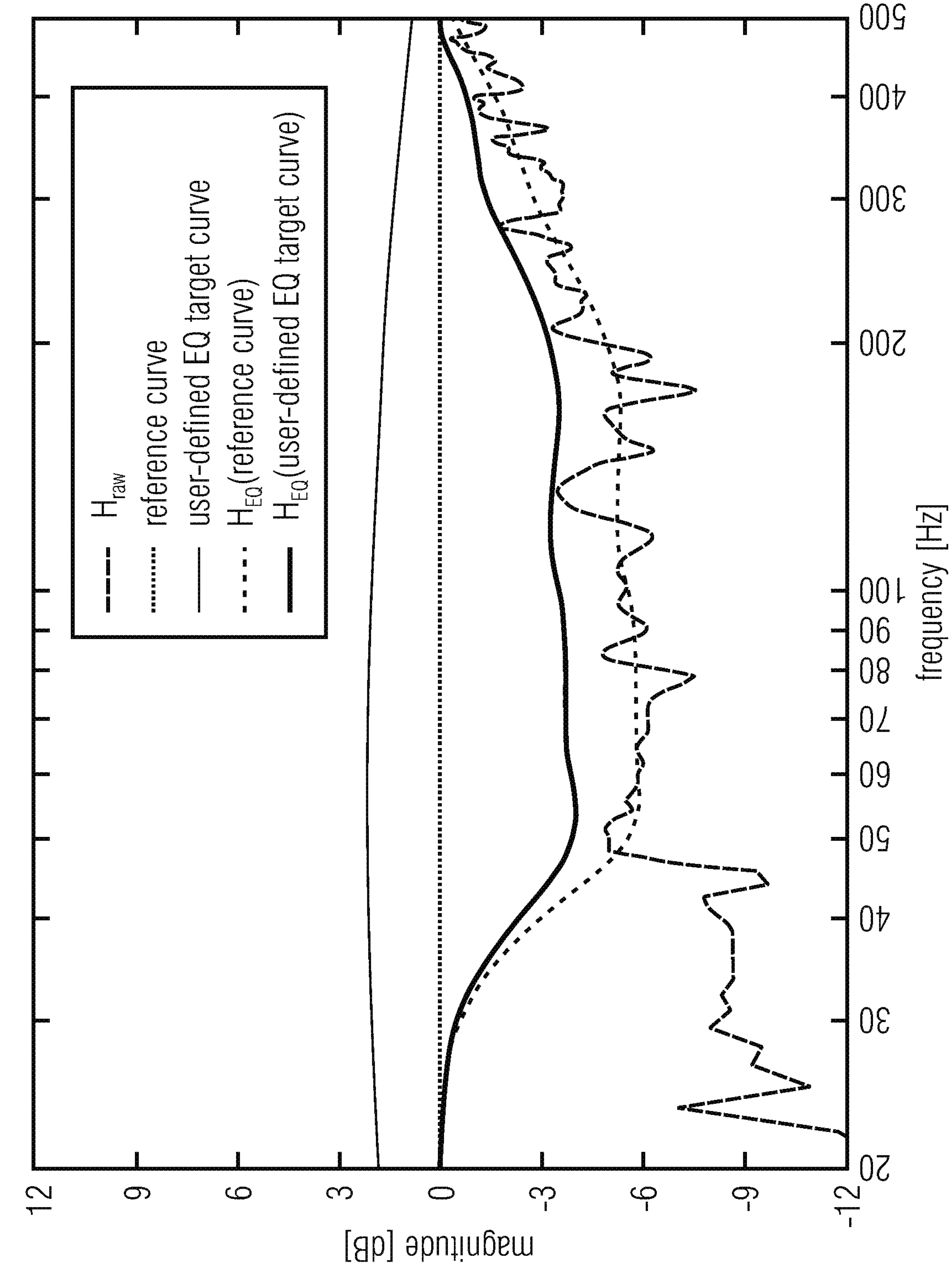
FIG. 17 illustrates a magnitude-response of a global equalization filter after an application of an additional user-defined equalization target curve.

In another embodiment, an additional user-defined equalization target curve may also be applied to obtain a user-defined global equalization. FIG. 17 illustrates the magnitude-response of the global equalization filter after the application of an additional user-defined equalization target curve on the initially obtained $H_{EQ}(\omega)$ according to a specific example, using 1-octave-band smoothing and band limiting (40 Hz↔500 Hz).

In the following, further embodiments for radiation impedance estimation and/or radiation resistance estimation are described.

According to an embodiment, the processing unit 120 may, e.g., be configured to determine a filter for at least one of the one or more drivers of at least one of the one or more loudspeakers depending on a user-defined equalization target curve.

According to an embodiment, the estimation unit 110 may, e.g., be configured to estimate the estimated sound pressure information and/or the estimated velocity information depending on a sound pressure at a microphone of one or more microphones.

In an embodiment, the one or more microphones are spaced apart from said loudspeaker.

According to an embodiment, the estimation unit 110 may, e.g., be configured to estimate the estimated sound pressure information depending on the sound pressure at said microphone of one or more microphones.

In an embodiment, the one or more microphones are exactly one microphone.

According to an embodiment, the estimation unit 110 may, e.g., be configured to estimate the estimated velocity information depending on the sound pressure at said microphone.

In an embodiment, the estimation unit 110 may, e.g., be configured to estimate the estimated velocity information not depending on measuring a current, and not depending on measuring a voltage, and not depending on measuring a displacement signal, and not depending on measuring an acceleration signal, and not depending on displacing said microphone to get a second measurement.

According to an embodiment, the estimation unit 110 may, e.g., be configured to estimate the estimated velocity information depending on the estimated sound pressure information which indicates the estimation of the sound pressure at said driver of said loudspeaker.

In an embodiment, the estimation unit 110 may, e.g., be configured to estimate the estimated sound pressure information depending on the sound pressure at said microphone.

According to an embodiment, the estimation unit 110 may, e.g., be configured to estimate the estimated sound pressure information further depending on a transfer function H, wherein the transfer function H is different from H(ω)=1, wherein ω indicates angular frequency.

In an embodiment, the estimation unit 110 may, e.g., be configured to estimate the estimated sound pressure information depending on:

$$P_s(\omega) = \frac{P_m(\omega)}{H(\omega)}$$

wherein $P_s$ is the estimated sound pressure information which indicates the estimation of the sound pressure at said driver of said loudspeaker, and wherein $P_m$ is the sound pressure at said microphone.

According to an embodiment, the transfer function may, e.g., be a free-field transfer function.

In an embodiment, the transfer function may, e.g., depend on a surface on which the apparatus 100 is placed. Or, the apparatus 100 is placed in an environment, and the transfer function may, e.g., depend on one or more surfaces of the environment.

According to an embodiment, the estimation unit 110 may, e.g., be configured to estimate the estimated sound pressure information as $$P_s(\omega)=P_m(\omega)$$

wherein $P_s$ is the estimated sound pressure information which indicates the estimation of the sound pressure at said driver of said loudspeaker, wherein $P_m$ is the sound pressure at said microphone, and wherein co indicates angular frequency.

In an embodiment, the estimation unit 110 may, e.g., be configured to estimate a magnitude of the estimated velocity information as an estimated magnitude of the estimated velocity information, and/or wherein the estimation unit 110 may, e.g., be configured to estimate a phase of the estimated velocity information as an estimated phase of the estimated velocity information. The estimation unit 110 may, e.g., be configured to estimate the estimated velocity information depending on the estimated magnitude of the estimated velocity information and/or depending on the estimated phase of the estimated velocity information.

According to an embodiment, the estimation unit 110 may, e.g., be configured to estimate the estimated velocity information depending on $$V_e=V_{abs}\exp(iV_{ang})$$

wherein $V_e$ indicates the estimated velocity information, wherein $V_{abs}$ indicates the estimated magnitude, wherein $V_{ang}$ indicates the estimated phase, and wherein i indicates imaginary number.

In an embodiment, the estimation unit 110 may, e.g., be configured to estimate the estimated magnitude and/or the estimated phase depending on an acceleration or an estimated acceleration at a surface of said driver of said loudspeaker.

According to an embodiment, the estimation unit may, e.g., be configured to estimate the estimated magnitude $V_{abs}$ depending on $$V_{abs} = \left|\frac{A_e}{i\omega}\right|;$$

wherein the estimation unit may, e.g., be configured to estimate the estimate phase $V_{ang}$ depending on $$V_{ang} = \text{angle}\left(\frac{A_e}{i\omega}\right);$$

wherein $A_e$ indicates the acceleration or the estimated acceleration, wherein i indicates imaginary number, and wherein co indicates angular frequency.

In an embodiment, the estimation unit 110 may, e.g., be configured to estimate the estimated acceleration by conducting a function minimization technique or a function maximization technique depending on a function for obtaining the estimated acceleration and depending on the estimation of the sound pressure at said driver of said loudspeaker.

According to an embodiment, the function minimization technique may, e.g., be a Nelder-Mead simplex method.

In an embodiment, the estimation unit 110 may, e.g., be configured to estimate a mass as an estimated mass, a stiffness as an estimated stiffness and a resistance as an estimated resistance. The estimation unit 110 may, e.g., be configured to estimate the estimated acceleration depending on the estimated mass and depending on the estimated stiffness and depending on the estimated resistance.

According to an embodiment, to estimate the estimated acceleration, the estimation unit 110 may, e.g., be configured to minimize $$g(M, K, R) = \min\left(\left\|1 - \frac{G}{\text{mean}(G)}\right\|_2\right),$$

wherein M indicates the mass, wherein K indicates the stiffness, wherein R indicates the resistance, and wherein $\|\ \|_2$ indicates Euclidean norm, and $$G = \left|\frac{P_s}{A_e(M, K, R)}\right|$$

wherein $P_s$ indicates the estimation of the sound pressure at said driver of said loudspeaker, and wherein $A_e(M,K,R)$ indicates the function for obtaining the estimated acceleration.

In an embodiment, the function $A_e(M,K,R)$ for obtaining the estimated acceleration may, e.g., be defined according to $$A_e(\omega) = \left(M + \frac{R}{i\omega} + \frac{K}{(i\omega)^2}\right)^{-1} U(\omega),$$

wherein $U=\max(|P_s|)$ indicates a maximum absolute value of the sound pressure at said driver of said loudspeaker, wherein i indicates imaginary number, and wherein co indicates angular frequency.

According to an embodiment, to estimate the estimated phase, the estimation unit 110 may, e.g., be configured to minimize $$f(M, K, R) = \min\left(\frac{\left\|\text{angle}\left(\frac{P_{ff}}{V_{ff}}\right) - \text{angle}\left(\frac{P_s}{V_e}\right)\right\|_2}{\left\|\text{angle}\left(\frac{P_{ff}}{V_{ff}}\right)\right\|_2}\right),$$

wherein $P_{ff}$ indicates a pre-measured or pre-computed pressure, wherein $V_{ff}$ indicates a pre-measured or pre-computed velocity, wherein M indicates the mass, wherein K indicates the stiffness, wherein R indicates the resistance, and wherein $\| \|_2$ indicates Euclidean norm.

In an embodiment, to estimate the estimated radiation impedance Z of one of the one or more drivers of one loudspeaker of the one or more loudspeakers, the estimation unit 110 may, e.g., be configured to estimate the estimated radiation impedance Z by estimating the estimated sound pressure information $P_s$, by estimating two velocity estimates $V_e(U_1)$, $V_e(U_2)$ as the estimated velocity information, and by estimating the estimated radiation impedance Z depending on $$Z = \text{mean}\left[\alpha\frac{P_s}{V_e(U_1)}, \beta\frac{P_s}{V_e(U_2)}\right]$$

wherein mean indicates a function which determines an average of two parameters, wherein α and β are weighting factors which depend on a proximity of a microphone of the one or more microphones to said loudspeaker.

Some embodiments aim to measure or estimate the power radiated into a room by a source of sound (in this case a loudspeaker), to enable digital control of the generated sound field. To achieve this, it is sufficient to measure or estimate the radiation impedance, which is indicative of the power radiated into the room. The radiation impedance, Z(ω), is given by the ratio of the sound pressure at the driver, P(ω), to the normal velocity of the driver, V(ω), as follows:

$$Z(\omega) = C\frac{P(\omega)}{V(\omega)}, \tag{17}$$

wherein C is a constant related to the area of the driver diaphragm, and ω is angular frequency.

In some embodiments, only one pressure signal may, e.g., be used, that is obtained via one microphone placed externally to the source of sound, to estimate the pressure and velocity. More microphones can of course be used. However, according to these embodiments, a single microphone suffices. Thus, according to these embodiments, the radiation impedance and/or radiation resistance can be estimated based on only a single measured signal.

Figure 18:
FIG. 18 illustrates a radiation impedance and/or radiation resistance estimation according to another embodiment, which depends on a single microphone.

FIG. 18 illustrates a radiation impedance and/or resistance estimation according to another embodiment, which depends on a single microphone.

Figure 19:
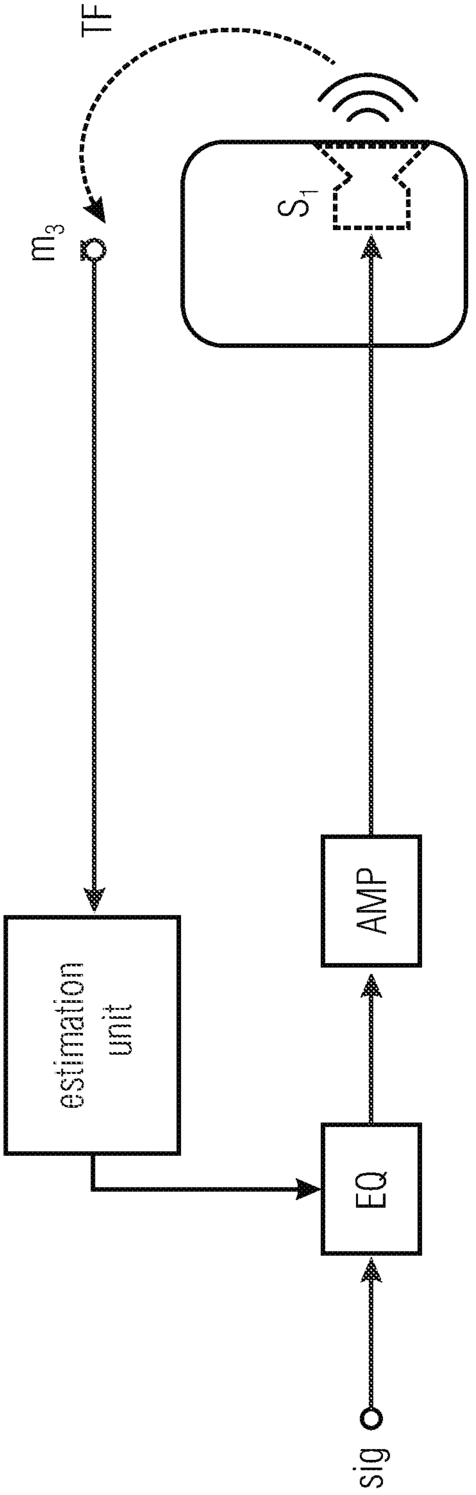
FIG. 19 illustrates a radiation impedance and/or radiation resistance estimation according to a further embodiment, which depends on only a single pressure measurement from a single microphone.

FIG. 19 illustrates a radiation impedance and/or resistance estimation according to a further embodiment, which depends on only a single pressure measurement from a single microphone. FIG. 19 represents a modified version of FIG. 4.

The method of estimation is described in what follows.

In the following, estimation of pressure is described.

The acoustic pressure generated by the source in the room is measured, near the source. A transfer function of the source is used to estimate the pressure at the source:

$$P_s(\omega) = \frac{P_m(\omega)}{H(\omega)}, \tag{18}$$

where $P_s$ is the estimated pressure at the source, $P_m$ is the measured pressure at a microphone, and H is the transfer function. Just for clarity: the relation between the formula and FIG. 19 is as follows: $P_s$ corresponds to the estimated pressure at source $S_1$. $P_m$ corresponds to the pressure measured at/with microphone $m_3$. The transfer function H corresponds to what is indicated with the arrow TF. The transfer function is a complex function in the frequency domain.

The transfer function can be chosen to reflect the installation conditions of the microphone and loudspeaker. For example, if the microphone is positioned directly in front of the loudspeaker driver, then the transfer function may be equal to the number 1, for every frequency, e.g. H(ω)=1.

As a second example, a free-field transfer function could be used. This could be obtained by measurement in an anechoic chamber, by simulation using a wave modeling method, or by computation using a mathematical model.

As a third example, the transfer function could include the effects of, e.g., placing the device on different surfaces, e.g. a floor, or a table.

As a fourth example, the transfer function could include the effects of multiple nearby surfaces, e.g., when the device is placed on a shelf, or in a room.

In a simplified version of the implementation, it may be assumed that H(ω)=1 even when the microphone is not positioned in front of the driver. This allows the pressure estimation step to be bypassed, thus providing the more efficient, albeit possibly less accurate, estimation $P_s(\omega)=P_m(\omega)$.

In the following, estimation of velocity is described.

The estimation of the velocity is based on the measured acoustic pressure. The estimation comprises two steps: estimating the magnitude of the velocity, and estimating the phase of the velocity.

Now, estimation of the magnitude is described.

Figure 20:
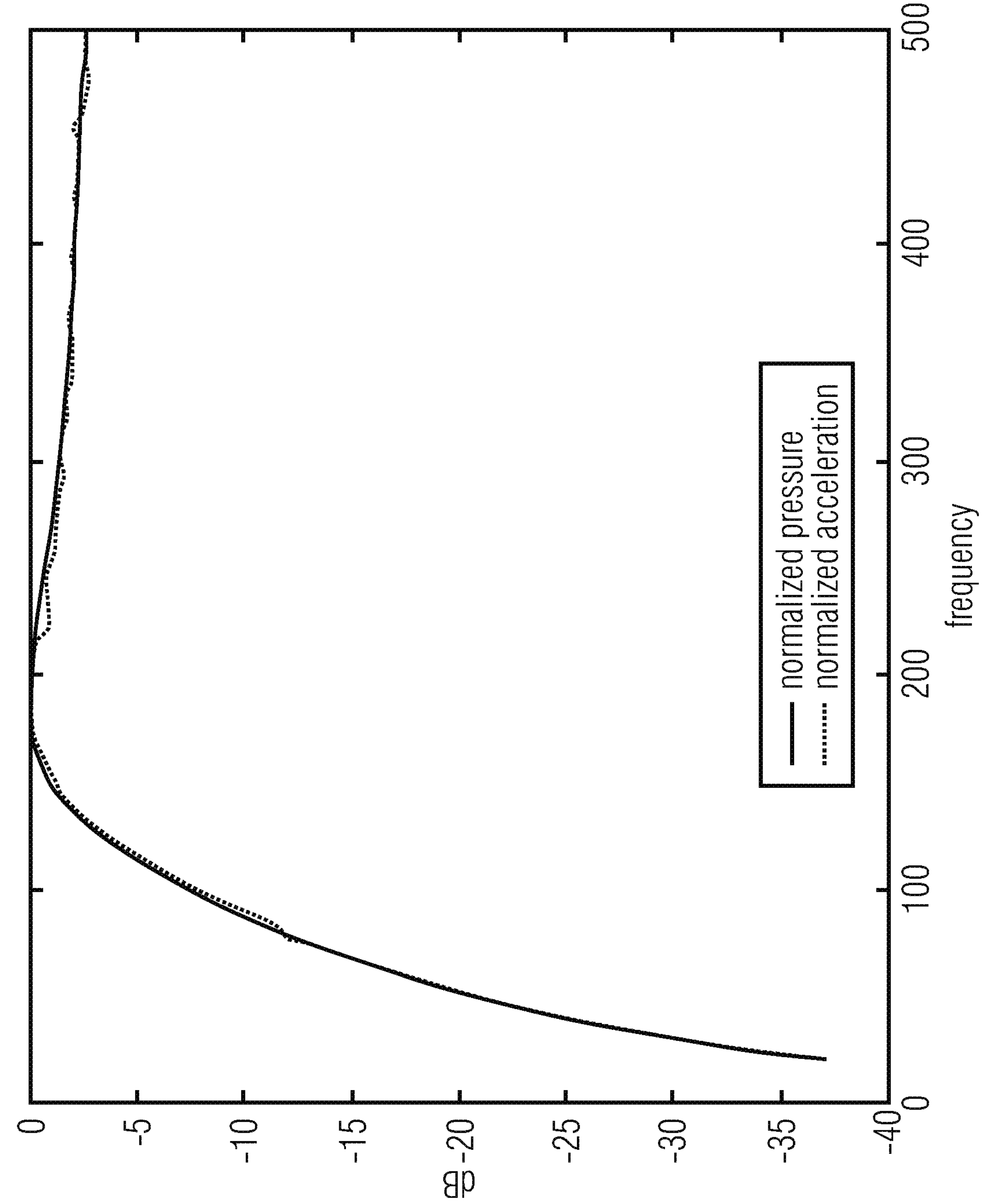
FIG. 20 illustrates a comparison of measured normalized pressure and measured normalized acceleration.

We begin by noting that the acoustic pressure generated by the source is proportional to the acceleration at the surface of the source, as can be seen in FIG. 20.

FIG. 20 illustrates a comparison of measured normalized pressure and measured normalized acceleration.

In free-field conditions, if the source pressure magnitude is divided by the magnitude of the surface acceleration, the resulting function $$G = \left|\frac{P_s}{A}\right|$$

will be approximately a constant function of frequency. In an enclosed space, like a room, G will depend on the resonances of the room, but it will still be possible to find a constant which passes through the function, as can be seen in FIG. 21 below.

Figure 21:
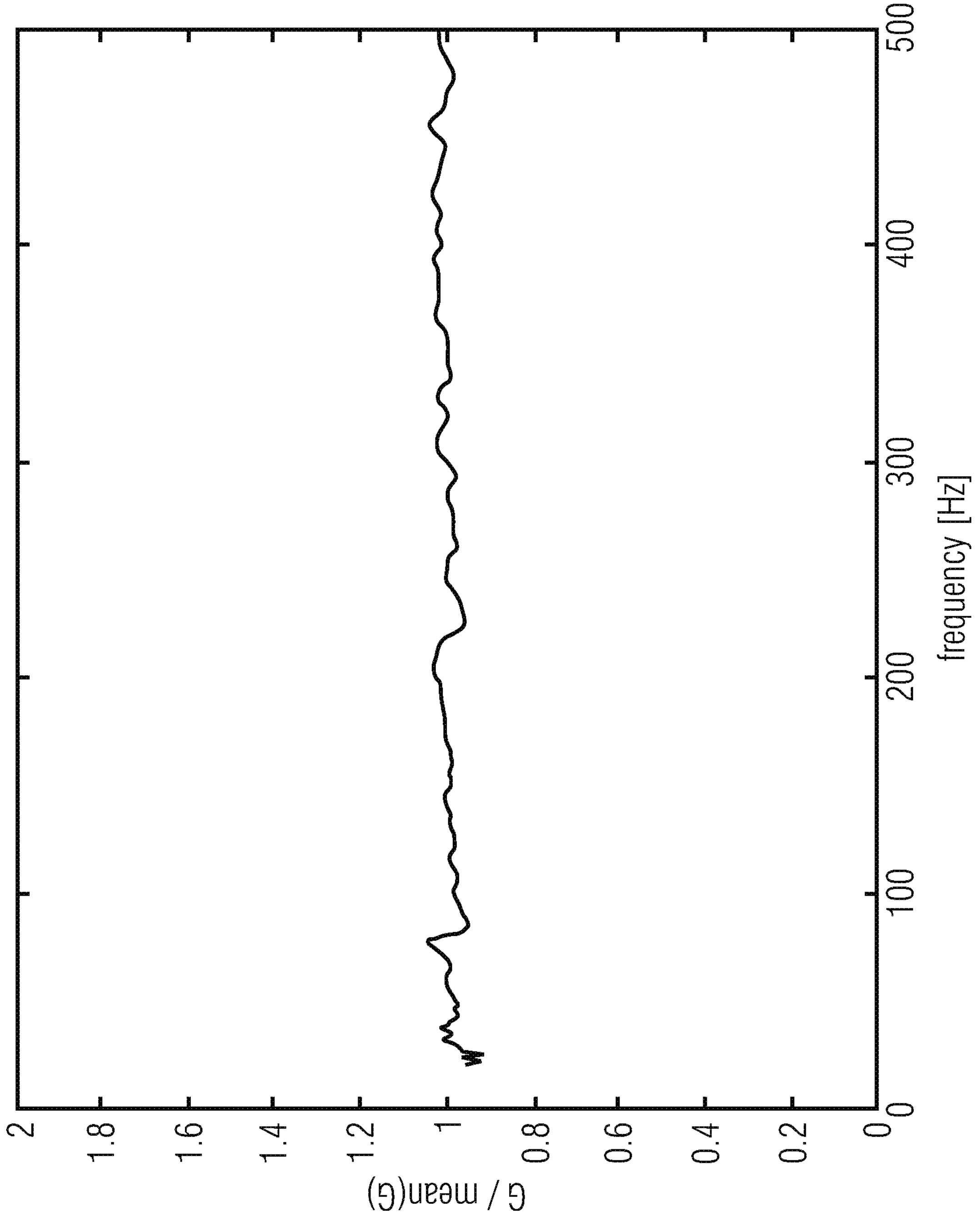
FIG. 21 illustrates a mean normalized ratio of the pressure to the acceleration, when measured in a room (in-room)

FIG. 21 illustrates a mean normalized ratio of the pressure to the acceleration, when measured in a room (in-room).

Since there is a relation between the surface velocity and acceleration, using an estimate of the acceleration will give an estimate of the velocity. To estimate the acceleration a linear model of the loudspeaker may, e.g., be employed, for example, as follows:

$$u = Ma + Rv + Kx, \tag{19}$$

where u is a source function, M a mass, K a stiffness, and R a resistance. The acceleration, a, is equal to the time derivative of the velocity, v, which in turn is equal to the time derivative of displacement, x:

$$a = \frac{dv}{dt} = \frac{d^2x}{dt^2}, \tag{20}$$

where x indicates an axial displacement of the loudspeaker diaphragm. In the frequency domain, one obtains:

$$A = i\omega V = (i\omega)^2 X. \tag{21}$$

Using the model given in Equation (19), in the frequency domain, one can estimate an acceleration $$A_e(\omega) = \left(M + \frac{R}{i\omega} + \frac{K}{(i\omega)^2}\right)^{-1} U(\omega), \tag{22}$$

where $U = \max(|P_s|)$ is the maximum absolute value of the estimated source pressure, by finding the complex parameters, M, K, and R, which minimise the cost function $$g(M, K, R) = \min\left(\left\|1 - \frac{G}{\text{mean}(G)}\right\|_2\right), \tag{23}$$

where $$G = \left|\frac{P_s}{A_e(M, K, R)}\right|$$

is the estimated source pressure normalized by the estimated surface acceleration.

Equation (23) is solved using a function minimization technique, like, e.g., the Nelder-Mead simplex method [1], [2]. The solution to the minimization problem provides an estimated acceleration, from which the estimated magnitude of the velocity can be computed, using Equation (21)

$$V_{abs} = |V_e| = \left|\frac{A_e}{i\omega}\right|. \tag{24}$$

Note that, as the shape of the magnitude of the velocity does not change significantly between rooms, a look-up table may also be used to estimate the magnitude of the velocity.

Now, estimation of the phase is described.

The estimation of the phase of the velocity is based on the phase angle of the ratio of a pre-measured, or pre-computed, pressure to a pre-measured, or pre-computed, velocity. These quantities may be measured, or computed, based on a desired device installation condition, e.g. free-field, or close to a reflecting surface.

As an example, the phase angle of the ratio of the free-field pressure, $P_{ff}$, to the free-field velocity, $V_{ff}$, is presented here. The free-field quantities used are either measured in an anechoic chamber, simulated using a wave modeling method, or computed using a mathematical model.

The model presented in Equation (22) is used to find the phase of the velocity. The source function for the model, U, includes the phase of the measured pressure, shifted by 90 degrees. The complex parameters that minimise the cost function $$f(M, K, R) = \min\left(\frac{\left\|\text{angle}\left(\frac{P_{ff}}{V_{ff}}\right) - \text{angle}\left(\frac{P_s}{V_e}\right)\right\|_2}{\left\|\text{angle}\left(\frac{P_{ff}}{V_{ff}}\right)\right\|_2}\right), \text{ s.t. angle}\left(\frac{P_s}{V_e}\right) < 90^\circ \tag{25}$$

are used to give an estimate of the phase of the velocity. Equation (25) is solved using a function minimization technique, like, e.g., the Nelder-Mead simplex method [1, 2].

Figure 22:
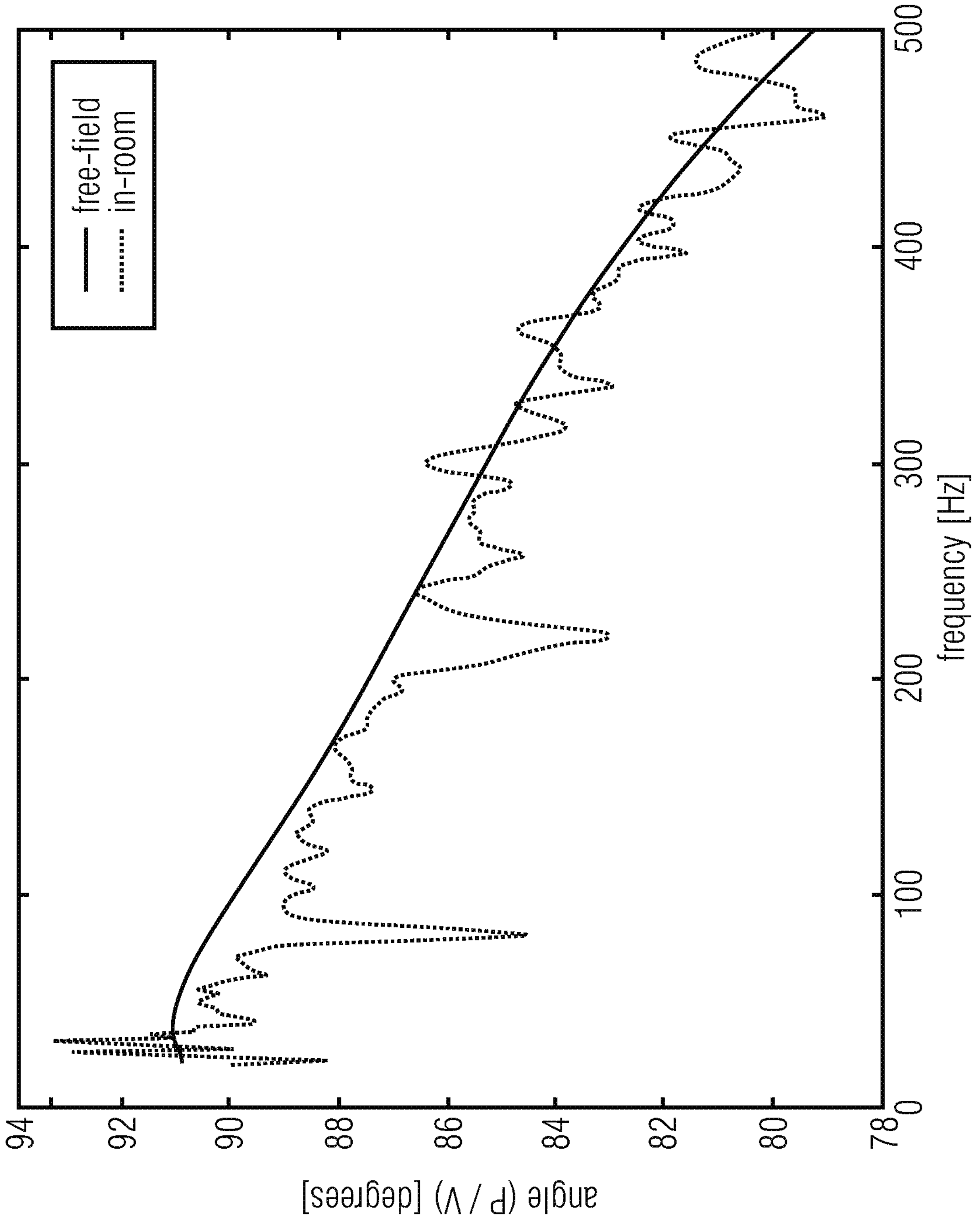
FIG. 22 illustrates a comparison of the free-field and in-room phase of the radiation impedance as a function of frequency.

A comparison of the free-field angle and in-room angle profiles are shown in FIG. 22.

FIG. 22 illustrates a comparison of the free-field and in-room phase of the radiation impedance as a function of frequency.

In practice, as the microphone is placed further away from the loudspeaker, is has been found to be beneficial to perform this estimation twice; once with the source term being a function of the unwrapped phase of the estimated source pressure $$U_1 = \max(|P_s|)\exp\left[i\left(\text{angle}(P_s) + \frac{\pi}{2}\right)\right], \tag{26}$$

and a second time with a smoothed version of the unwrapped phase of the pressure $$U_2 = \max(|P_s|)\exp\left[i\left(Q + \frac{\pi}{2}\right)\right], \tag{27}$$

where $Q = q(\text{angle}(P_s)_i)$ is a function fitted to the phase angle of the pressure. In the function Q, the subscript i indicates the phase angle located at the ith peak (where peak indicates e.g. either local maxima or local minima) of the gradient of the phase, $$\frac{d[\text{angle}(P_s)]}{df}$$

Figure 23:
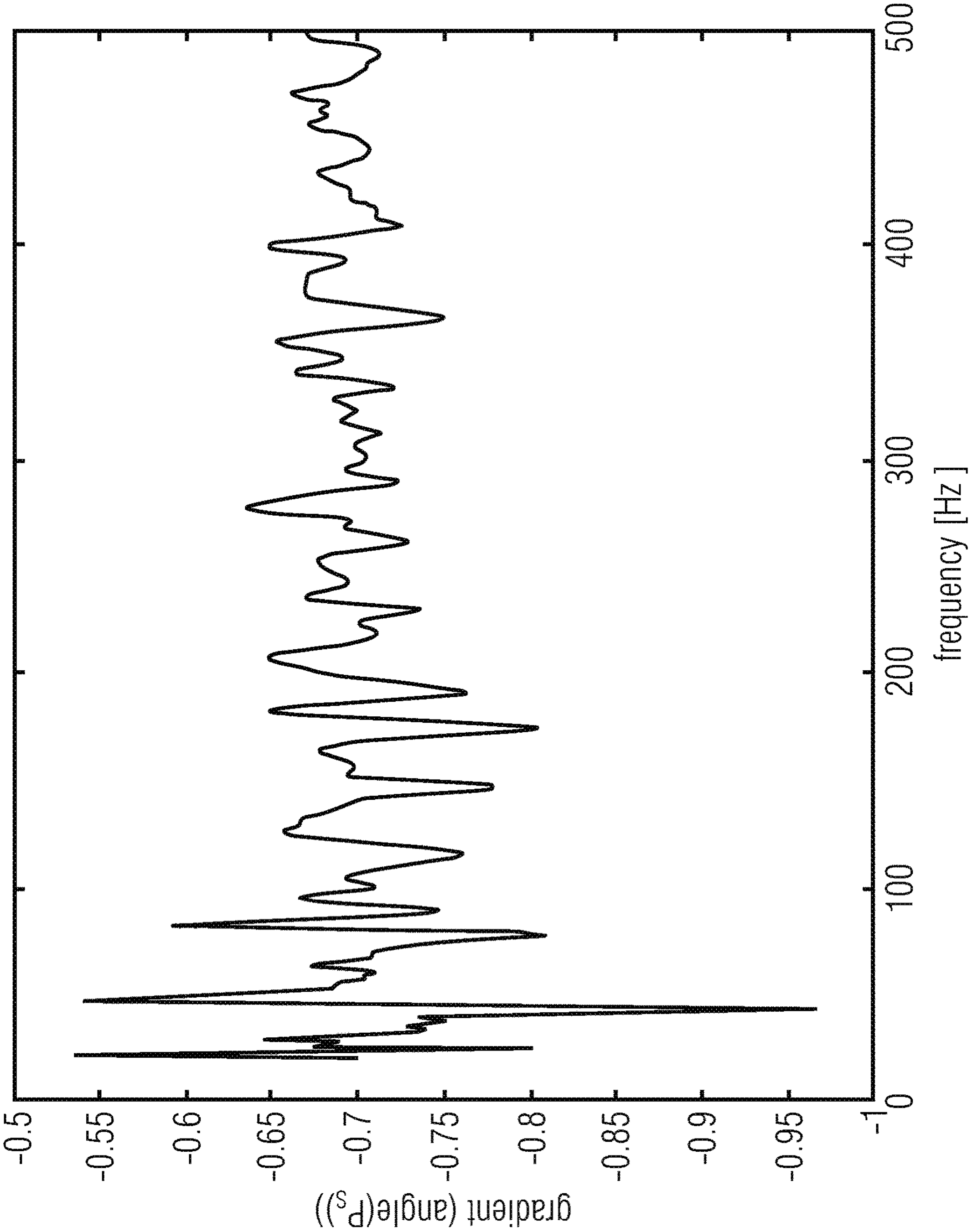
FIG. 23 illustrates a gradient of a phase angle of a pressure signal.

(shown in FIG. 23, which illustrates the gradient of the phase angle of the pressure). The function q is a piecewise interpolating function that may be of any order, e.g., cubic.

In summary, the fitted function is e.g. obtained by interpolating between the phase angles located at the frequencies at which the peaks of the gradient of the phase occur. However, other (polynomial) fitting procedures can also be applied. These estimates are used in the radiation impedance estimation stage that follows.

The phase of the velocity is estimated by $$V_{ang} = \text{angle }(V_e) = \text{angle}\left(\frac{A_e}{i\omega}\right). \tag{28}$$

Thus, the estimated velocity may, e.g., be determined as follows:

The estimation of the complex velocity may, e.g., be defined as:

$$V_e = V_{abs}\exp(iV_{ang}). \tag{29}$$

Once the pressure and velocity of the source have been estimated, the radiation impedance can be calculated.

In a particular embodiment, two estimates of the velocity may, e.g., be employed. In such an embodiment, from these estimates, two intermediate estimates of the radiation impedance are obtained, which are then used to estimate a final radiation impedance $$Z = \text{mean}\left[\alpha\frac{P_s}{V_e(U_1)}, \beta\frac{P_s}{V_e(U_2)}\right], \tag{30}$$

where α and β depend on the proximity of the microphone to the measured loudspeaker. Typically both parameters are equal to unity, α=1, and β=1, but they may be tuned to improve the accuracy of the estimation.

The radiation resistance may, e.g., be determined according to $$Z_r = \text{real}(Z). \tag{31}$$

In embodiments, to impose a global equalization, a set of filters designed to flatten the radiation resistance curve, with respect to some target curve, are computed. The choice of target curve will depend on the desired loudspeaker response. In this application, beneficial use has been made of a modelled (simulated) free-field radiation resistance. The free-field radiation resistance can be measured in an anechoic chamber, simulated using a wave modeling method, or computed using a mathematical model.

The free-field and in-room radiation resistances are compared in FIG. 24 to FIG. 28. It can be seen that the theoretical radiation resistance is a straight line, while the modelled (or simulated) radiation resistance is curved. The model takes the actual shape of the loudspeaker driver into account, while the theoretical approximation does not; the model gives a more accurate description of the radiation resistance. The free-field radiation resistance can be used as a target curve for the generation of global equalization filters.

In a particular embodiment, the reference radiation resistance curve $R_r^{(ref)}(\omega)$ may, e.g., be selected to perform global equalization by comparing the estimated radiation resistance to a target curve, which may be e.g. a modeled one, a measured one, or the theoretical one.

Gain alignment may be applied to align the target curve and the estimated radiation resistance.

Such gain alignment could e.g. be realized by taking the average level over a specific reference frequency range of the target curve and the estimated radiation resistance.

Figure 24:
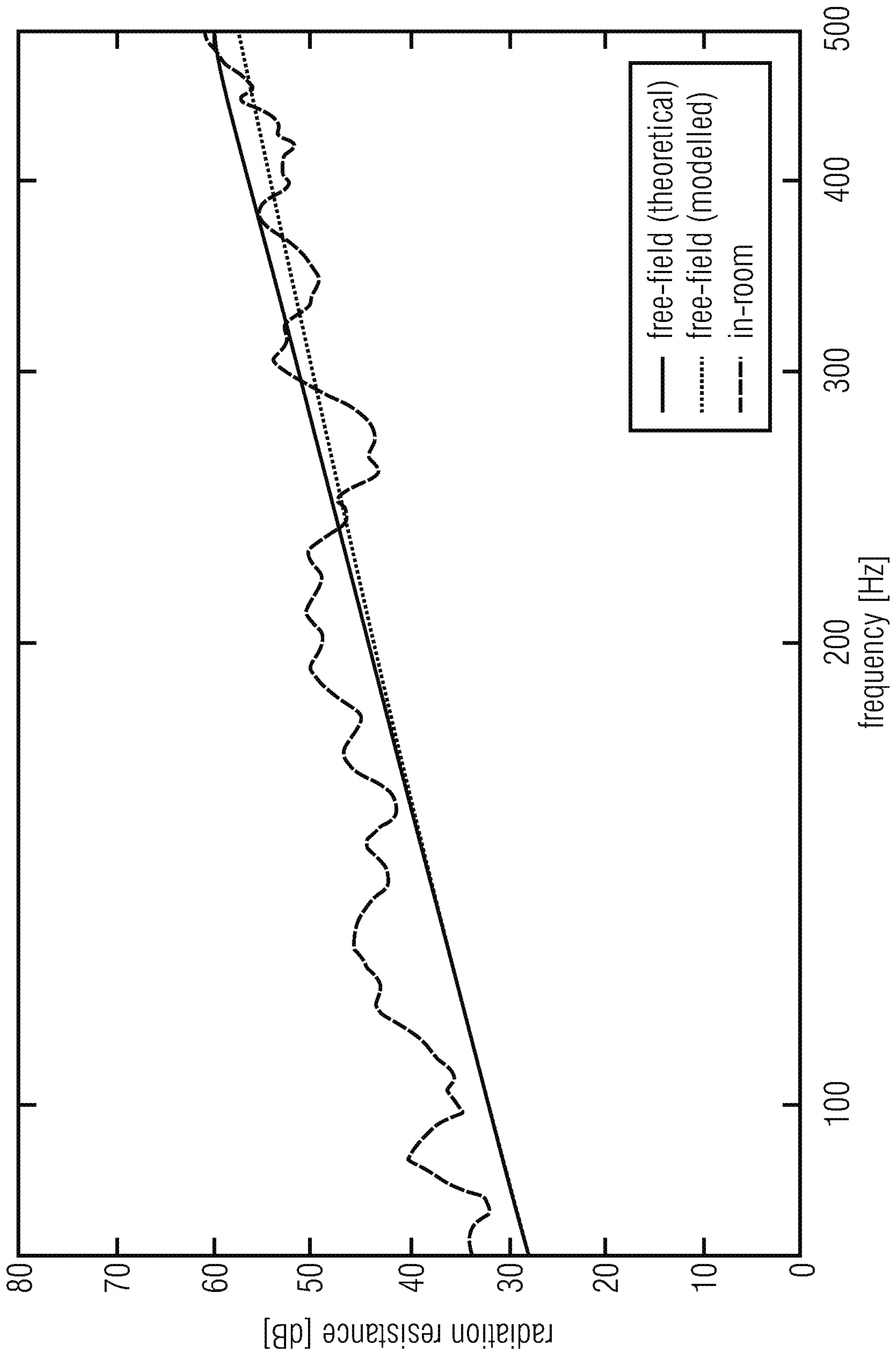
FIG. 24 illustrates a comparison of free-field and in-room radiation resistances for a first loudspeaker.

FIG. 24 illustrates a comparison of free-field and in-room radiation resistances for a first loudspeaker.

Figure 25:
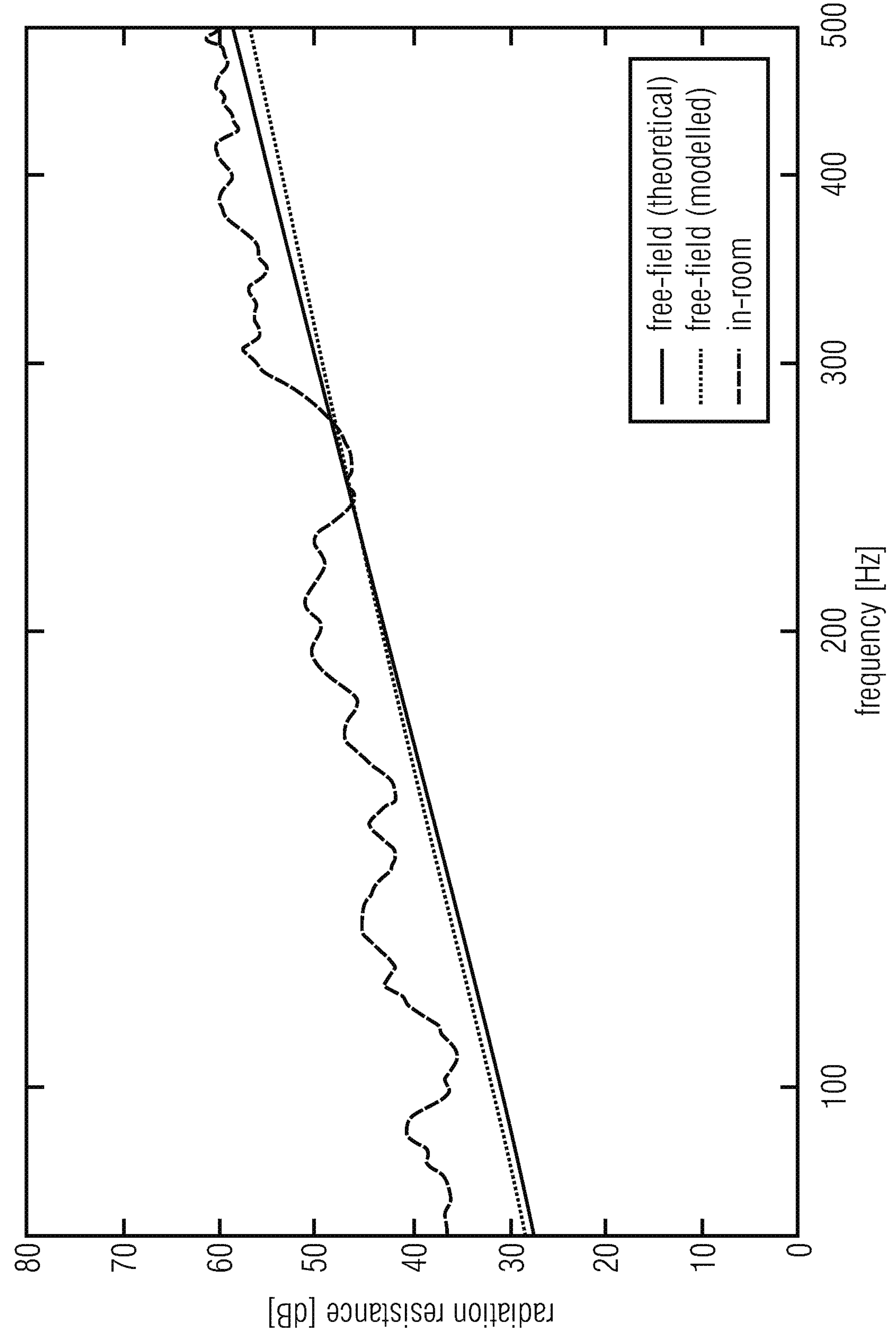
FIG. 25 illustrates a comparison of free-field and in-room radiation resistances for a second loudspeaker.

FIG. 25 illustrates a comparison of free-field and in-room radiation resistances for a second loudspeaker.

Figure 26:
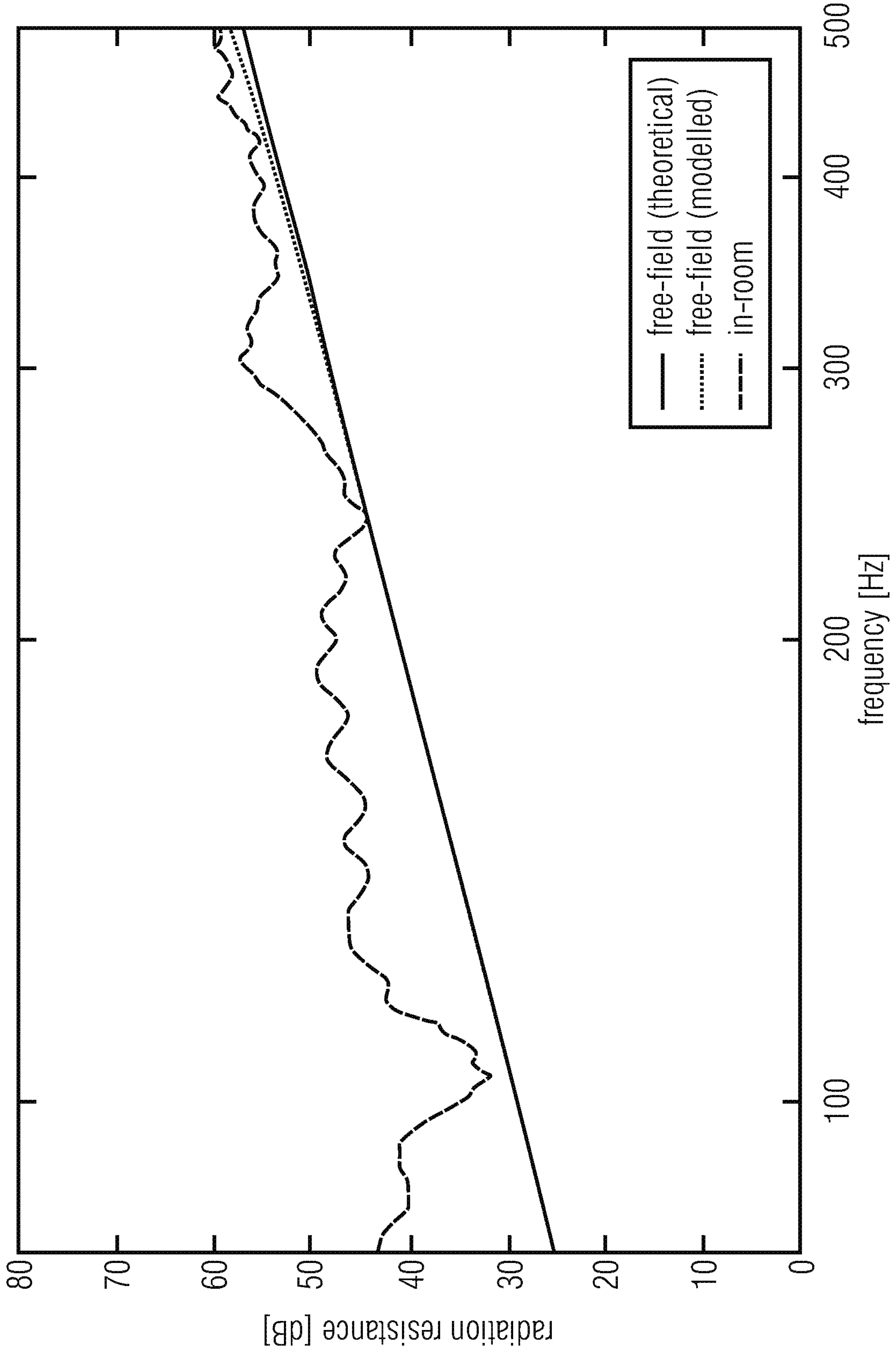
FIG. 26 illustrates a comparison of free-field and in-room radiation resistances for a third loudspeaker.

FIG. 26 illustrates a comparison of free-field and in-room radiation resistances for a third loudspeaker.

Figure 27:
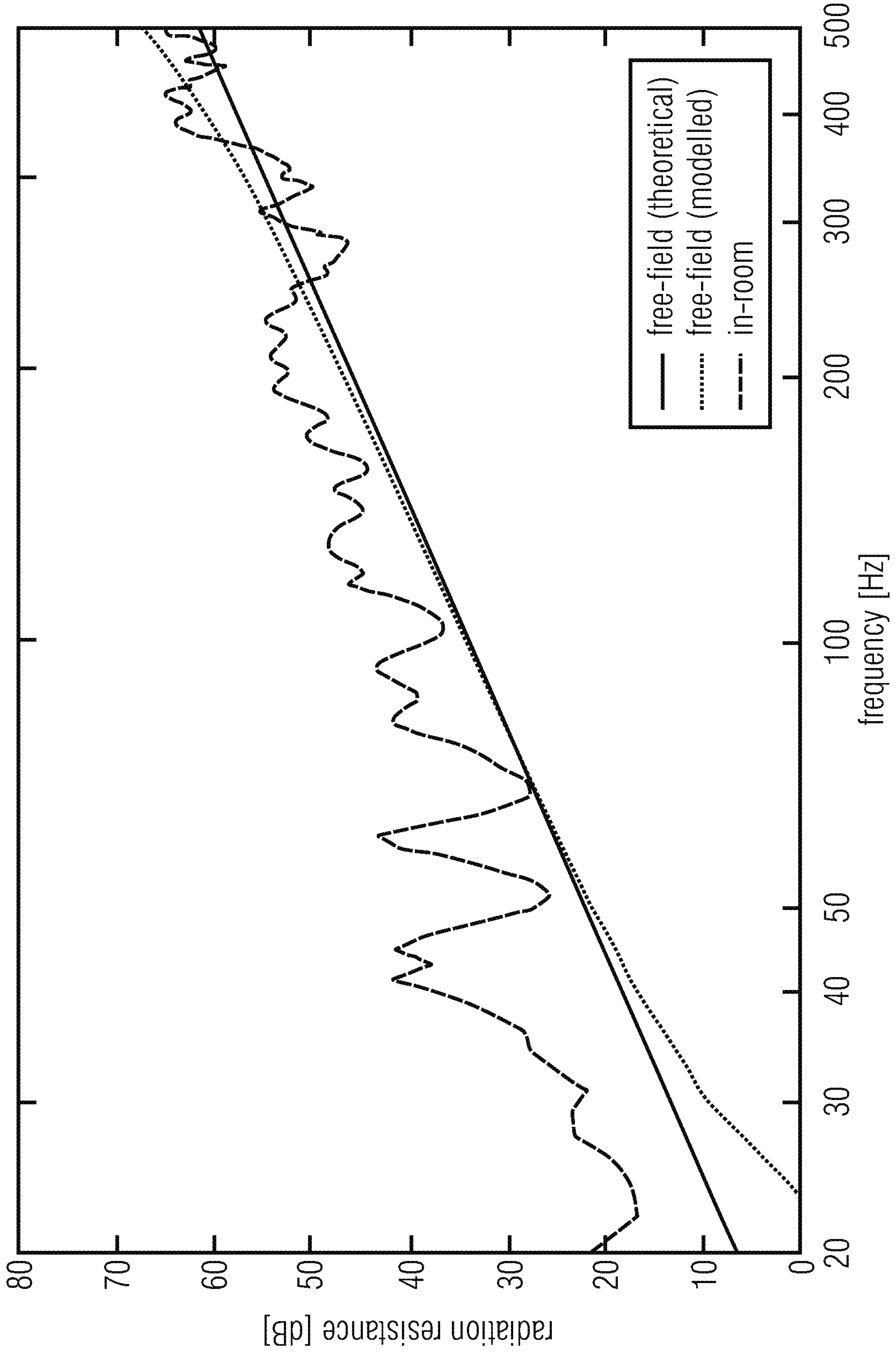
FIG. 27 illustrates a comparison of free-field and in-room radiation resistances, for a fourth loudspeaker.

FIG. 27 illustrates a comparison of free-field and in-room radiation resistances for a fourth loudspeaker.

Figure 28:
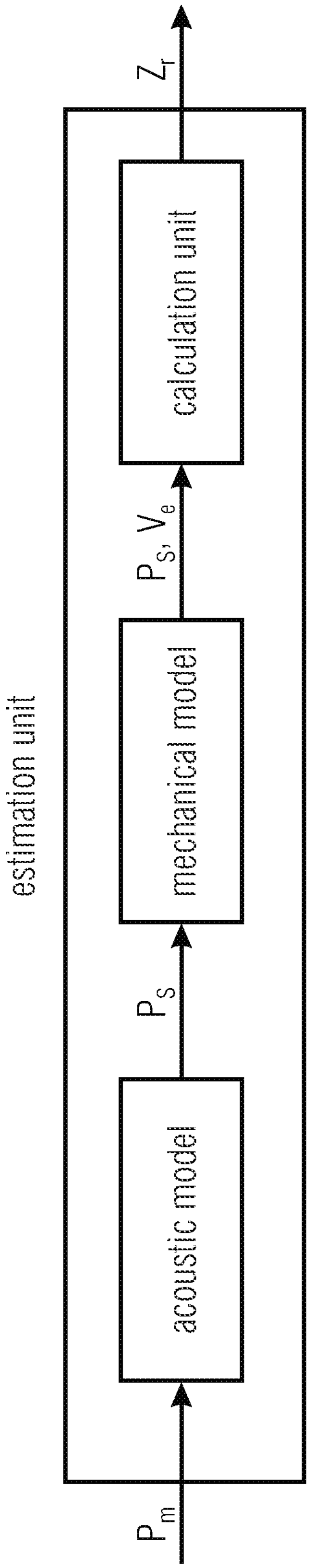
FIG. 28 illustrates an overview of the estimation process according to an embodiment.

FIG. 28 illustrates an overview of the estimation process as described above, which is a modification/update of FIG. 8.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims can be interpreted as including all such alterations, permutations and equivalents as fall within the true spirit and scope of the present invention.

LITERATURE

[1] Nelder, J. A. and Mead, R., A Simplex Method for Function Minimization, *The Computer Journal*, Volume 7, Issue 4, January 1965, pp. 308-313.

[2] Lagarias, J. C., Reeds, J. A., Wright, M. H., and Wright, P. E., Convergence Properties of the Nelder—Mead Simplex Method in Low Dimensions, *SIAM Journal on Optimization*, Volume 9, Number 1, December 1998, pp. 112-147.

The invention claimed is:

1. An apparatus for processing an audio input signal comprising one or more audio input channels to acquire an audio output signal comprising one or more audio output channels, wherein the apparatus comprises:

an estimation unit configured to estimate a radiation resistance of each driver of one or more drivers of each loudspeaker of one or more loudspeakers as an estimated radiation resistance; or configured to estimate a radiation impedance of each driver of the one or more drivers of each loudspeaker of the one or more loudspeakers as an estimated radiation impedance, wherein said estimated radiation impedance of said driver comprises estimated information on the radiation resistance of said driver, and a processing unit configured to acquire the one or more audio output channels by processing each audio input channel of the one or more audio input channels depending on the estimated radiation resistance or depending on the estimated radiation impedance of each of the one or more drivers of each of the one or more loudspeakers, wherein to estimate the estimated radiation resistance or the estimated radiation impedance of each driver of the one or more drivers of each loudspeaker of the one or more loudspeakers, the estimation unit is configured to estimate the estimated radiation resistance or the estimated radiation impedance using at least one of estimated sound pressure information and estimated velocity information, wherein the estimated sound pressure information indicates an estimation of sound pressure at said driver of said loudspeaker instead of a measurement of the sound pressure directly at said driver, and wherein the estimated velocity information indicates an estimation of a driver velocity of said driver of said loudspeaker instead of a measurement of the driver velocity directly at said driver.

2. The apparatus according to claim 1, wherein to estimate the estimated radiation resistance or the estimated radiation impedance of said driver of said loudspeaker, the estimation unit is configured to estimate the estimated radiation resistance or the estimated radiation impedance by estimating estimated sound pressure information indicating an estimation of sound pressure at said driver of said loudspeaker, and/or by estimating estimated velocity information indicating an estimation of a driver velocity of said driver of said loudspeaker.

3. The apparatus according to claim 1, wherein the estimation unit is configured to estimate the estimated sound pressure information such that the estimated sound pressure information is represented in a spectral domain, and/or wherein the estimation unit is configured to estimate the estimated velocity information such that the estimated velocity information is represented in the spectral domain, and wherein the estimation unit is configured to estimate the estimated radiation resistance or the estimated radiation impedance of said driver of said loudspeaker such that the estimated radiation resistance or the estimated radiation impedance of said driver of said loudspeaker is represented in the spectral domain.

4. The apparatus according to claim 1, wherein the estimation unit is configured to estimate the estimated sound pressure information and/or the estimated velocity information depending on a sound pressure at a microphone of one or more microphones.

5. The apparatus according to claim 4, wherein the one or more microphones are spaced apart from said loudspeaker.

6. The apparatus according to claim 4, wherein the estimation unit is configured to estimate the estimated sound pressure information depending on the sound pressure at said microphone of the one or more microphones.

7. The apparatus according to claim 4, wherein the one or more microphones are exactly one microphone.

8. The apparatus according to claim 4, wherein the estimation unit is configured to estimate the estimated velocity information depending on the sound pressure at said microphone.

9. The apparatus according to claim 8,
wherein the estimation unit is configured to estimate the estimated velocity information
not depending on measuring a current, and
not depending on measuring a voltage, and
not depending on measuring a displacement signal, and
not depending on measuring an acceleration signal, and
not depending on displacing said microphone to get a second measurement.

10. The apparatus according to claim 8,
wherein the estimation unit is configured to estimate the estimated velocity information depending on the estimated sound pressure information which indicates the estimation of the sound pressure at said driver of said loudspeaker.

11. The apparatus according to claim 10,
wherein the estimation unit is configured to estimate the estimated sound pressure information depending on the sound pressure at said microphone.

12. The apparatus according to claim 11,
wherein the estimation unit is configured to estimate the estimated sound pressure information further depending on a transfer function H, wherein the transfer function H is different from H(ω)=1, wherein ω indicates angular frequency.

13. The apparatus according to claim 12,
wherein the estimation unit is configured to estimate the estimated sound pressure information depending on:

$$P_s(\omega) = \frac{P_m(\omega)}{H(\omega)}$$

wherein $P_s$ is the estimated sound pressure information which indicates the estimation of the sound pressure at said driver of said loudspeaker, and
wherein $P_m$, is the sound pressure at said microphone.

14. The apparatus according to claim 12,
wherein the transfer function is a free-field transfer function.

15. The apparatus according to claim 12,
wherein the transfer function depends on a surface on which the apparatus is placed, or
wherein the apparatus is placed in an environment, and the transfer function depends on one or more surfaces of the environment.

16. The apparatus according to claim 11,
wherein the estimation unit is configured to estimate the estimated sound pressure information as $$P_s(\omega)=P_m(\omega)$$

wherein $P_s$ is the estimated sound pressure information which indicates the estimation of the sound pressure at said driver of said loudspeaker,
wherein $P_m$ is the sound pressure at said microphone, and
wherein ω indicates angular frequency.

17. The apparatus according to claim 8,
wherein the estimation unit is configured to estimate a magnitude of the estimated velocity information as an estimated magnitude of the estimated velocity information, and/or wherein the estimation unit is configured to estimate a phase of the estimated velocity information as an estimated phase of the estimated velocity information,
wherein the estimation unit is configured to estimate the estimated velocity information depending on the estimated magnitude of the estimated velocity information and/or depending on the estimated phase of the estimated velocity information.

18. The apparatus according to claim 17,
wherein the estimation unit is configured to estimate the estimated velocity information depending on $$V_e=V_{abs}\exp(iV_{ang})$$

wherein $V_e$ indicates the estimated velocity information,
wherein $V_{abs}$ indicates the estimated magnitude,
wherein $V_{ang}$ indicates the estimated phase, and
wherein i indicates imaginary number.

19. The apparatus according to claim 17,
wherein the estimation unit is configured to estimate the estimated magnitude and/or the estimated phase depending on an acceleration or an estimated acceleration at a surface of said driver of said loudspeaker.

20. The apparatus according to claim 19,
wherein the estimation unit is configured to estimate the estimated magnitude $V_{abs}$ depending on $$V_{abs} = \left|\frac{A_e}{i\omega}\right|;$$

and/or
wherein the estimation unit is configured to estimate the estimate phase $V_{ang}$ depending on $$V_{ang} = \text{angle}\left(\frac{A_e}{i\omega}\right);$$

wherein $A_e$ indicates the acceleration or the estimated acceleration,
wherein i indicates imaginary number, and
wherein ω indicates angular frequency.

21. The apparatus according to claim 19,
wherein the estimation unit is configured to estimate the estimated acceleration by conducting a function minimization technique or a function maximization technique depending on a function for acquiring the estimated acceleration and depending on the estimation of the sound pressure at said driver of said loudspeaker.

22. The apparatus according to claim 21,
wherein the function minimization technique is a Nelder-Mead simplex method.

23. The apparatus according to claim 21,
wherein the estimation unit is configured to estimate and/or receive information on a mass as an estimated mass, and on a stiffness as an estimated stiffness, and on a resistance as an estimated resistance, and
wherein the estimation unit is configured to estimate the estimated acceleration depending on the estimated mass and depending on the estimated stiffness and depending on the estimated resistance.

24. The apparatus according to claim 23,
wherein, to estimate the estimated acceleration, the estimation unit is configured to minimize $$g(M, K, R) = \min\left(\left\|1 - \frac{G}{\text{mean }(G)}\right\|_2\right),$$

wherein M indicates the mass,
wherein K indicates the stiffness,
wherein R indicates the resistance, and
wherein $\| \|_2$ indicates Euclidean norm, and $$G = \left|\frac{P_s}{A_e(M, K, R)}\right|$$

wherein $P_s$ indicates the estimation of the sound pressure at said driver of said loudspeaker, and wherein $A_e$(M,K,R) indicates the function for acquiring the estimated acceleration.

25. The apparatus according to claim 24, wherein the function $A_e$(M,K,R) for acquiring the estimated acceleration is defined according to $$A_e(\omega) = \left(M + \frac{R}{i\omega} + \frac{K}{(i\omega)^2}\right)^{-1} U(\omega),$$

wherein U=max(|$P_s$|) indicates a maximum absolute value of the sound pressure at said driver of said loudspeaker, wherein i indicates imaginary number, and wherein ω indicates angular frequency.

26. The apparatus according to claim 23, wherein, to estimate the estimated phase, the estimation unit is configured to minimize $$f(M, K, R) = \min\left(\frac{\left\|\text{angle}\left(\frac{P_{ff}}{V_{ff}}\right) - \text{angle}\left(\frac{P_s}{V_e}\right)\right\|_2}{\left\|\text{angle}\left(\frac{P_{ff}}{V_{ff}}\right)\right\|_2}\right),$$

wherein $P_{ff}$ indicates a pre-measured or pre-computed pressure, wherein $V_{ff}$ indicates a pre-measured or pre-computed velocity, wherein M indicates the mass, wherein K indicates the stiffness, wherein R indicates the resistance, and wherein $\|\ \|_2$ indicates Euclidean norm.

27. The apparatus according to claim 1, wherein, to estimate the estimated radiation impedance Z of one of the one or more drivers of one loudspeaker of the one or more loudspeakers, the estimation unit is configured to estimate the estimated radiation impedance Z by estimating the estimated sound pressure information $P_s$, by estimating two velocity estimates $V_e(U_1)$, $V_e(U_2)$ as the estimated velocity information, and by estimating the estimated radiation impedance Z depending on $$Z = \text{mean}\left[\alpha\frac{P_s}{V_e(U_1)}, \beta\frac{P_s}{V_e(U_2)}\right]$$

wherein mean indicates a function which determines an average of two parameters, wherein α and β are weighting factors which depend on a proximity of a microphone of the one or more microphones to said loudspeaker.

28. The apparatus according to claim 1, wherein the estimation unit is configured to estimate the estimated velocity information depending on a current through a loudspeaker driver coil of said driver of said loudspeaker.

29. The apparatus according to claim 28, wherein the estimation unit is configured to estimate the estimated velocity information further depending on an electrical resistance $R_e$, a coil inductance $L_e$, a force factor Bl, a mechanical mass M, a total stiffness K, a mechanical resistance $R_m$.

30. The apparatus according to claim 29, wherein the estimation unit is configured to determine the estimated velocity information depending on an equation system, being defined according to:

$$\begin{bmatrix} \dot{I} \\ \dot{x} \\ \dot{v} \end{bmatrix} = \begin{bmatrix} -R_e/L_e & 0 & -Bl/L_e \\ 0 & 0 & 1 \\ Bl/M & -K/M & -R_m/M \end{bmatrix} \begin{bmatrix} I \\ x \\ v \end{bmatrix} + \begin{bmatrix} 1/L_e \\ 0 \\ 0 \end{bmatrix} u(t)$$

wherein u(t) indicates an excitation signal, wherein t indicates time, wherein v indicates said driver velocity of said driver of said loudspeaker, wherein x indicates an axial displacement of a loudspeaker diaphragm of said loudspeaker, wherein I indicates the current through the loudspeaker driver coil of said driver of said loudspeaker, wherein the notation ˙ represents a first-order derivative with respect to time.

31. The apparatus according to claim 30, wherein the estimation unit is configured to solve the equation system using a fourth-order Runge-Kutta method.

32. The apparatus according to claim 1, wherein the estimated velocity information is stored within the apparatus.

33. The apparatus according to claim 32, wherein the estimated velocity information is stored in a look-up table which is stored within the apparatus, wherein the estimation unit is configured to derive the estimated velocity information from the look-up table.

34. The apparatus according to claim 33, wherein the estimation unit is configured to derive the estimated velocity information from the look-up table using a driving voltage level as an input to the look-up table.

35. The apparatus according to claim 1, wherein the one or more loudspeakers are a first loudspeaker, wherein the one or more drivers of the first loudspeaker are a first driver of the first loudspeaker, wherein the estimation unit is configured to estimate the radiation resistance of the first driver of the first loudspeaker as the estimated radiation resistance; or is configured to estimate the radiation impedance of the first driver of the first loudspeaker as the estimated radiation impedance.

36. The apparatus according to claim 35, wherein the one or more audio input channels are a first input channel, wherein the one or more audio output channels are a first output channel for the first driver, wherein the processing unit is configured to determine a first filter for the first driver depending on the estimated radiation resistance or depending on the estimated radiation impedance, and wherein the processing unit is configured to apply the first filter for the first driver on the first input channel to acquire the first output channel for the first driver.

37. The apparatus according to claim 36, wherein the processing unit is configured to determine a further filter for each further driver of one or more further drivers of each further loudspeaker of one or more further loudspeakers depending on the first filter for the first driver, and the processing unit is configured to apply the further filter of each further driver of the one or more further drivers of each further loudspeaker of the one or more further loudspeakers on a further input signal of one or more further input signals to acquire a further output signal of one or more further output signals for said further driver.

38. The apparatus according to claim 37, wherein the processing unit is configured to determine a global equalization filter by determining the further filter for at least one of the one or more further drivers of at least one of the one or more further loudspeakers, wherein the processing unit is configured to employ an initial unprocessed filter curve of the first driver for the one or more further drivers to acquire a smoothed filter curve for the at least one of the one or more further drivers.

39. The apparatus according to claim 38, wherein the processing unit is configured to determine the further filter for the at least one of the one or more further drivers of the at least one of the one or more further loudspeakers by employing frequency limiting to restrict an equalization into a frequency range for the at least one of the one or more further drivers.

40. The apparatus according to claim 1, wherein the estimation unit is configured to estimate two or more radiation resistances or two or more radiation impedances for two or more drivers of the one or more loudspeakers, wherein the processing unit is configured to determine two or more unprocessed filter curves for the two or more drivers depending on the two or more radiation resistances or the two or more radiation impedances, wherein the processing unit is configured to determine a weighted-average filter curve by determining a weighted average of the two or more unprocessed filter curves, or is configured to determine a smoothed weighted-average filter curve by determining a smoothed weighted average of the two or more unprocessed filter curves, and wherein the processing unit is configured to apply the weighted-average filter curve, or the smoothed weighted-average filter curve, or a filter curve derived from the weighted-average filter curve or from the smoothed weighted-average filter curve, on an audio input signal of the one or more audio input signals to acquire an audio output signal of the one or more audio output signals for a different driver being different from the two or more drivers.

41. The apparatus according to claim 1, wherein the processing unit is configured to determine a filter for at least one of the one or more drivers of at least one of the one or more loudspeakers depending on a user-defined equalization target curve.

42. The apparatus according to claim 1, wherein the estimation unit is configured to predict linear parameters of said driver of said loudspeaker by solving a minimization problem to estimate the estimated radiation resistance or the estimated radiation impedance of said driver of said loudspeaker.

43. The apparatus according to claim 42, wherein the estimation unit is configured to predict linear parameters of said driver of said loudspeaker by solving the minimization problem with cost function $$f(g) = \min\left(\frac{\|I_S - I(g)\|_2}{\|I_S\|_2}\right),$$

wherein $I_S$ indicates a measured current, wherein I(g) indicates a simulated current, wherein $\| \|_2$ indicates Euclidean norm, and wherein $g=\langle R_e, L_e, Bl, K, M, R_m\rangle$ indicates a vector of unknown parameters, with electrical resistance $R_e$, coil inductance $L_e$, force factor Bl, total stiffness K, mechanical mass M, and mechanical resistance $R_m$.

44. The apparatus according to claim 1, wherein the estimation unit is configured to use said estimated sound pressure information to estimate said estimated velocity information.

45. The apparatus according to claim 44, wherein the estimation unit is configured to employ $$\dot{v} = -\frac{1}{\rho}\nabla p$$

wherein $\dot{v}$ is a time derivative of the estimated velocity information, wherein $\nabla$ is a gradient operator, wherein p is the estimated sound pressure information in a time domain, wherein $\rho$ is a medium density.

46. The apparatus according to claim 1, wherein the processing unit is configured to determine a difference between the estimated radiation resistance of said driver of said loudspeaker and a predefined radiation resistance, and wherein the processing unit is configured to process the one or more audio input channels depending on the difference between the estimated radiation resistance of said driver of said loudspeaker and the predefined radiation resistance.

47. The apparatus according to claim 46, wherein the processing unit is configured to modify a spectral shape of at least one of the one or more audio input channels depending on the difference between the estimated radiation resistance of said driver of said loudspeaker and the predefined radiation resistance.

48. The apparatus according to claim 47, wherein the processing unit is configured to determine a spectral modification factor for each spectral band of a plurality of spectral bands depending on the difference between the estimated radiation resistance of said driver of said loudspeaker and the predefined radiation resistance for said spectral band, and wherein, for each audio input channel of the one or more audio input channels, to acquire one of the one or more audio output channels, the processing unit is configured to apply the spectral modification factor of each spectral band of the plurality of spectral bands, on said spectral band of said audio input channel.

49. The apparatus according to claim 46, wherein the processing unit is configured to determine the difference between the estimated radiation resistance of said driver of said loudspeaker and the predefined radiation resistance according to $$H_{raw}(\omega) = \sqrt{\frac{R_r^{(ref)}(\omega)}{R_r(\omega)}}$$

wherein $H_{raw}(\omega)$ indicates said difference,
wherein $R_r(\omega)$ indicates the estimated radiation resistance,
wherein $R_r^{(ref)}(\omega)$ indicates the predefined radiation resistance,
wherein ω indicates an angular frequency.

50. The apparatus according to claim 46,
wherein the processing unit is configured to apply a smoothing operation on said difference being an unprocessed filter prototype to acquire a smoothed filter prototype, and
wherein the processing unit is configured to apply the smoothed filter prototype on at least one of the one or more audio input channels to acquire at least one of the one or more audio output channels.

51. The apparatus according to claim 1,
wherein the processing unit is configured to apply a global equalizer on at least one of the one or more audio input channels to acquire at least one intermediate signal,
wherein the processing unit is configured to determine a relative sound power in a spectral domain from the estimated radiation resistance or from the estimated radiation impedance,
wherein the processing unit is configured to determine one or more peaks within the relative sound power in the spectral domain, and
wherein the processing unit is configured to apply a further equalizer on the at least one intermediate signal depending on the one or more peaks within the relative sound power in the spectral domain to acquire at least one of the one or more audio output channels.

52. The apparatus according to claim 4,
wherein the estimation unit is configured to estimate the estimated sound pressure information depending on captured sound pressure information recorded by the one or more microphones.

53. The apparatus according to claim 52,
wherein the one or more microphones are spaced apart from said loudspeaker.

54. The apparatus according to claim 52,
wherein the one or more microphones are two or more microphones,
wherein the estimation unit is configured to receive the captured sound pressure information from the two or more microphones,
wherein the estimation unit is configured to use the captured sound pressure information from only one of the two or more microphones to determine the estimated sound pressure information, and
wherein the estimation unit is configured to not use the captured sound pressure information from the other microphones of the two or more microphones to determine the estimated sound pressure information.

55. The apparatus according to claim 52,
wherein the one or more microphones are two or more microphones,
wherein the estimation unit is configured to receive the captured sound pressure information from the two or more microphones,
wherein the estimation unit is configured to determine an average of the captured sound pressure information from the two or more microphones, and to determine the estimated sound pressure information using the average of the captured sound pressure information.

56. The apparatus according to claim 52,
wherein the one or more microphones are two or more microphones,
wherein the estimation unit is configured to receive the captured sound pressure information from the two or more microphones,
wherein the estimation unit is configured to determine a weighted average of the captured sound pressure information from the two or more microphones, and to determine the estimated sound pressure information using the weighted average of the captured sound pressure information.

57. The apparatus according to claim 52,
wherein the one or more microphones are two or more microphones,
wherein the one or more loudspeakers are two or more loudspeakers and/or at least one of the one or more loudspeakers comprises two or more drivers,
wherein the estimation unit is configured to receive the captured sound pressure information from the two or more microphones,
wherein the estimation unit is configured to determine, for each driver of the one or more drivers of each loudspeaker of the one or more loudspeakers, a weighted average of the captured sound pressure information from the two or more microphones, and to determine the estimated sound pressure information using the weighted average of the captured sound pressure information, wherein the estimation unit is configured to determine said weighted average depending on a plurality of weights, wherein each weight of the plurality of weights depends on a position of said driver and depends on a position of each of the two or more microphones.

58. The apparatus according to claim 52,
wherein the one or more microphones are two or more microphones,
wherein the one or more loudspeakers are two or more loudspeakers and/or at least one of the one or more loudspeakers comprises two or more drivers,
wherein, for each driver of the one or more drivers of the one or more loudspeakers, the estimation unit is configured to select one of the two or more microphones as a selected microphone, wherein, for said driver, the estimation unit is configured to use the captured sound pressure information from the selected microphone to determine the estimated sound pressure information, and wherein, for said driver, the estimation unit is configured to not use the captured sound pressure information from the other microphones of the two or more microphones to determine the estimated sound pressure information.

59. The apparatus according to claim 58,
wherein, for each driver of the one or more drivers of the one or more loudspeakers, the estimation unit is configured to select one of the two or more microphones as a selected microphone depending on a position of said driver and depending on a position of each of the two or more microphones.

60. The apparatus according to claim 52,
wherein the estimation unit is configured to determine the estimated sound pressure information using a complex transfer function.

61. The apparatus according to claim 60,
wherein the estimation unit is configured to determine the estimated sound pressure information depending on $P \approx P_{m_1}/H$,
wherein P indicates the estimated sound pressure information, wherein $P_{m_3}$ indicates the captured sound pressure information, wherein H indicates the complex transfer function being defined as $$H(\omega) = \frac{P_{rec}}{P_{src}}$$

wherein ω indicates an angular frequency, wherein $P_{src}$ indicates an imposed sound pressure at said loudspeaker, wherein $P_{rec}$ indicates an estimated sound pressure at said one of the one or more microphones that is present when the sound pressure $P_{src}$ exists at said loudspeaker.

62. The apparatus according to claim 52, wherein at least one of the one or more microphones is not located on a main radiation direction of any of the one or more loudspeakers.

63. The apparatus according to claim 4, wherein at least one of the one or more microphones has not a direct line of sight to any of the one or more loudspeakers.

64. The apparatus according claim 4, wherein, for each microphone of the one or more microphones, a predefined distance between said microphone and the loudspeaker is at least 10 centimetres.

65. The apparatus according to claim 1, wherein the one or more audio input channels are two or more audio input channels, and wherein the one or more audio output channels are two or more audio output channels, wherein the processing unit is configured to acquire at least two of the two or more audio output channels by determining, depending on the estimated radiation resistance or depending on the estimated radiation impedance of at least one of the one or more drivers of each of the one or more loudspeakers, individual modification information for each audio input channel of the at least two of the two or more audio input channels, and by applying the individual modification information for each audio input channel of the at least two of the two or more audio input channels on said audio input channel.

66. The apparatus according to claim 1, wherein the estimation unit is configured to update the estimated radiation resistance or the estimated radiation impedance of the one or more drivers of the one or more loudspeakers at initialization and/or when requested and/or at runtime.

67. The apparatus according to claim 1, wherein the estimated radiation resistance is a first estimated radiation resistance before a first point in time, or the estimated radiation impedance is a first estimated radiation impedance before the first point in time, wherein the estimation unit is configured to estimate a second radiation resistance of each driver of the one or more drivers of each loudspeaker of the one or more loudspeakers as a second estimated radiation resistance after a second point in time; or is configured to estimate a second radiation impedance of each driver of the one or more drivers of each loudspeaker of the one or more loudspeakers as a second estimated radiation impedance after the second point in time, wherein said second estimated radiation impedance of said driver comprises estimated information on the second radiation resistance of said driver, wherein to estimate the second estimated radiation resistance or the second estimated radiation impedance of each driver of the one or more drivers of each loudspeaker of the one or more loudspeakers, the estimation unit is configured to estimate the second estimated radiation resistance or the second estimated radiation impedance depending on second estimated sound pressure information indicating an estimation of a second sound pressure at said driver of said loudspeaker, and depending on second estimated velocity information indicating an estimation of a second driver velocity of said driver of said loudspeaker, wherein the estimation unit is configured to determine and to output whether the apparatus is in a first state or whether the apparatus is in a second state depending on a radiation resistance difference indicating a difference between the second estimated radiation resistance and the first estimated radiation resistance, or depending on a radiation impedance difference indicating a difference between the second estimated radiation impedance and the first estimated radiation impedance, wherein the second state indicates that the apparatus is malfunctioning or that the apparatus has been relocated, and wherein the first state indicates that the apparatus is functioning and that the apparatus has not been relocated.

68. The apparatus according to claim 52, wherein the estimation unit is configured to estimate the second estimated sound pressure information depending on captured second sound pressure information recorded by the one or more microphones, and/or wherein the estimation unit is configured to estimate the second estimated velocity information depending on a second current through the loudspeaker driver coil of said driver of said loudspeaker, wherein the estimated radiation resistance is a first estimated radiation resistance before a first point in time, or the estimated radiation impedance is a first estimated radiation impedance before the first point in time, wherein the estimation unit is configured to estimate a second radiation resistance of each driver of the one or more drivers of each loudspeaker of the one or more loudspeakers as a second estimated radiation resistance after a second point in time; or is configured to estimate a second radiation impedance of each driver of the one or more drivers of each loudspeaker of the one or more loudspeakers as a second estimated radiation impedance after the second point in time, wherein said second estimated radiation impedance of said driver comprises estimated information on the second radiation resistance of said driver, wherein to estimate the second estimated radiation resistance or the second estimated radiation impedance of each driver of the one or more drivers of each loudspeaker of the one or more loudspeakers, the estimation unit is configured to estimate the second estimated radiation resistance or the second estimated radiation impedance depending on second estimated sound pressure information indicating an estimation of a second sound pressure at said driver of said loudspeaker, and depending on second estimated velocity information indicating an estimation of a second driver velocity of said driver of said loudspeaker, wherein the estimation unit is configured to determine and to output whether the apparatus is in a first state or whether the apparatus is in a second state depending on a radiation resistance difference indicating a difference between the second estimated radiation resistance and the first estimated radiation resistance, or depending on a radiation impedance difference indicating a difference between the second estimated radiation impedance and the first estimated radiation impedance, wherein the second state indicates that the apparatus is malfunctioning or that the apparatus has been relocated, and wherein the first state indicates that the apparatus is functioning and that the apparatus has not been relocated.

69. The apparatus according to claim 67, wherein the estimation unit is configured to determine the radiation resistance difference by determining a difference value indicating a difference between the second estimated radiation resistance and the first estimated radiation resistance; or is configured to determine the radiation impedance difference by determining a difference value indicating a difference between the second estimated radiation impedance and the first estimated radiation impedance, wherein the estimation unit is configured to determine that the apparatus is in the second state, if the difference value is greater than a threshold value; and the estimation unit is configured to determine that the apparatus is in the first state, if the difference value is smaller than or equal to the threshold value.

70. A system, comprising:

the apparatus according to claim 1, and the loudspeaker, wherein the loudspeaker is configured to output at least one of the one or more audio output channels.

71. The system according to claim 70, wherein the system further comprises one or more microphones.

72. A method for processing an audio input signal comprising one or more audio input channels to acquire an audio output signal comprising one or more audio output channels, wherein the method comprises:

estimating a radiation resistance of each driver of one or more drivers of each loudspeaker of one or more loudspeakers as an estimated radiation resistance; or estimating a radiation impedance of each driver of the one or more drivers of each loudspeaker of the one or more loudspeakers as an estimated radiation impedance, wherein said estimated radiation impedance of said driver comprises estimated information on the radiation resistance of said driver, and acquiring the one or more audio output channels by processing each audio input channel of the one or more audio input channels depending on the estimated radiation resistance or depending on the estimated radiation impedance of each of the one or more drivers of each of the one or more loudspeakers, wherein to estimate the estimated radiation resistance or the estimated radiation impedance of each driver of the one or more drivers of each loudspeaker of the one or more loudspeakers, estimating the estimated radiation resistance or the estimated radiation impedance is conducted using at least one of estimated sound pressure information and estimated velocity information, wherein the estimated sound pressure information indicates an estimation of sound pressure at said driver of said loudspeaker instead of a measurement of the sound pressure directly at said driver, and wherein the estimated velocity information indicates an estimation of a driver velocity of said driver of said loudspeaker instead of a measurement of the driver velocity directly at said driver.

73. A non-transitory digital storage medium having stored thereon a computer program for performing a method for processing an audio input signal comprising one or more audio input channels to acquire an audio output signal comprising one or more audio output channels, wherein the method comprises:

estimating a radiation resistance of each driver of one or more drivers of each loudspeaker of one or more loudspeakers as an estimated radiation resistance; or estimating a radiation impedance of each driver of the one or more drivers of each loudspeaker of the one or more loudspeakers as an estimated radiation impedance, wherein said estimated radiation impedance of said driver comprises estimated information on the radiation resistance of said driver, and acquiring the one or more audio output channels by processing each audio input channel of the one or more audio input channels depending on the estimated radiation resistance or depending on the estimated radiation impedance of each of the one or more drivers of each of the one or more loudspeakers, wherein to estimate the estimated radiation resistance or the estimated radiation impedance of each driver of the one or more drivers of each loudspeaker of the one or more loudspeakers, estimating the estimated radiation resistance or the estimated radiation impedance is conducted using at least one of estimated sound pressure information and estimated velocity information, wherein the estimated sound pressure information indicates an estimation of sound pressure at said driver of said loudspeaker instead of a measurement of the sound pressure directly at said driver, and wherein the estimated velocity information indicates an estimation of a driver velocity of said driver of said loudspeaker instead of a measurement of the driver velocity directly at said driver, when said computer program is run by a computer.

* * * * *